(12) United States Patent
Hamasaki

(10) Patent No.: US 6,879,445 B2
(45) Date of Patent: Apr. 12, 2005

(54) POWER/MANUAL LENS BARREL HAVING A MANUAL OPERATING RING

(75) Inventor: Takuji Hamasaki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/690,649

(22) Filed: Oct. 23, 2003

(65) Prior Publication Data

US 2004/0105168 A1 Jun. 3, 2004

(30) Foreign Application Priority Data

Oct. 25, 2002 (JP) .................................... 2002-310441
Oct. 25, 2002 (JP) .................................... 2002-310442

(51) Int. Cl.[7] .............................................. G02B 15/14
(52) U.S. Cl. ....................................... 359/696; 359/694
(58) Field of Search ............................... 359/694, 696, 359/697, 823

(56) References Cited

U.S. PATENT DOCUMENTS

| | | | |
|---|---|---|---|
| 4,179,191 A | * 12/1979 | Freudenschuss et al. | .... 359/697 |
| 5,148,199 A | 9/1992 | Kohmoto et al. | |
| 5,239,417 A | 8/1993 | Eguchi et al. | |
| 5,969,889 A | * 10/1999 | Iikawa et al. | ................ 359/825 |
| 6,025,964 A | * 2/2000 | Yamamoto | .................... 359/824 |
| 6,075,655 A | * 6/2000 | Funahashi et al. | ........... 359/696 |
| 6,501,604 B1 | * 12/2002 | Onda | .......................... 359/696 |
| 6,631,035 B1 | 10/2003 | Iikawa et al. | |
| 2002/0018296 A1 | * 2/2002 | Kashiwaba et al. | .......... 359/554 |
| 2003/0095337 A1 | * 5/2003 | Tu et al. | ...................... 359/696 |

* cited by examiner

Primary Examiner—Ricky Mack
(74) Attorney, Agent, or Firm—Greenblum & Bernstein, P.L.C.

(57) ABSTRACT

A lens barrel includes a stationary member; a rotary input shaft; a manual operating ring rotatably supported by the stationary member and rotated by the rotary input shaft via a gear mechanism; an optical element movable along the optical axis by rotation of the manual operating ring; a hollow-cylindrical output gear having a cylindrical inner peripheral surface in which the rotary input shaft is fitted, and an outer gear portion; a non-circular cross section portion formed on the rotary input shaft to form an accommodation space between the rotary input shaft and the cylindrical inner peripheral surface; a ball installed in the accommodation space; and a biasing device for making the orthogonal surface and the ball come into pressing contact. The non-circular cross section portion is shaped so that the rotation of the rotary input shaft is transferred to the hollow-cylindrical output gear via the ball.

43 Claims, 12 Drawing Sheets

POWER/MANUAL LENS BARREL HAVING A MANUAL OPERATING RING

BACKGROUND OF THE INVENTION

1. Field of the Invention

The present invention relates to a power/manual lens barrel, at least one movable lens group of which moves along an optical axis by a motor or by manually rotating a manual operating ring to perform a focusing operation or a zooming operation.

2. Description of the Related Art

In an interchangeable lens of an SLR camera system, a rotary input shaft (AF rotary shaft) which is supported to be freely rotatable on the axis thereof is rotated by a motor provided in the camera body to move a focusing lens group (optical element) along the photographing optical axis by the rotation of the rotary input shaft. The interchangeable lens has a hand-operated focusing ring (manual operating ring) which is supported to be freely rotatable so that the focusing lens group moves along the photographing optical axis to adjust the focus of the lens by rotation of the focusing ring.

This type of power/manual lens barrel must be provided with a switching mechanism which prevents rotation of the manual operating ring from being transferred to the rotary input shaft when the manual operating ring is manually rotated. In addition, some kind of switching operation must be performed to make the switching mechanism operate.

A power zoom lens in which a zooming operation can be performed by motor or rotation of a hand-operated zoom ring (manual operating ring) must be provided with a similar switching mechanism, and also a similar switching operation must be performed to make the switching mechanism operate.

SUMMARY OF THE INVENTION

The present invention provides a power/manual lens barrel, wherein rotation of the rotary input shaft is transferred to the manual operating ring when the rotary input shaft is driven by a motor while rotation of the manual operating ring is prevented from being transferred to the rotary input shaft so that the motor cannot be rotated by the rotation of the manual operating ring when the manual operating ring is manually rotated, without requiring any special switching mechanism or operation.

The present invention provides a power/manual lens barrel, wherein at least one optical element is moved along the optical axis thereof without the manual operating ring being rotated when the rotary input shaft is driven by motor while rotation of the manual operating ring is prevented from being transferred to the rotary input shaft so that the motor cannot be rotated by the rotation of the manual operating ring when the manual operating ring is manually rotated, without requiring any switching mechanism or operation.

According to an aspect of the present invention, a lens barrel is provided, including a stationary member; a rotary input shaft which is rotatably supported by the stationary member to extend parallel to an optical axis, and includes an orthogonal surface lying in a plane orthogonal to an axis of the rotary input shaft; a manual operating ring which is rotatably supported by the stationary member, and is rotated by a rotation of the rotary input shaft via a gear mechanism; at least one optical element which is movable along the optical axis by a rotation of the manual operating ring; a hollow-cylindrical output gear having a cylindrical inner peripheral surface in which the rotary input shaft is fitted so that the hollow-cylindrical output gear can freely rotate on the rotary input shaft, and an outer gear portion which is formed on an outer peripheral surface of the hollow-cylindrical output gear to be concentric with the cylindrical inner peripheral surface, the outer gear portion serving as a part of the gear mechanism; a non-circular cross section portion formed on the rotary input shaft to be adjacent to the orthogonal surface to form at least one accommodation space between the rotary input shaft and the cylindrical inner peripheral surface; at least one ball installed in the accommodation space; and a biasing device for making the orthogonal surface and the ball come into pressing contact with each other. The non-circular cross section portion is shaped so that the rotation of the rotary input shaft is transferred to the hollow-cylindrical output gear via the ball, to which the rotation of the rotary input shaft is given via the orthogonal surface, when the rotary input shaft is driven to rotate.

It is desirable for the stationary member to be a stationary ring.

The optical element can be moved by a rotation of the manual operating ring when the manual operating ring is manually rotated or a rotation of the manual operating ring when the manual operating ring is rotated by the rotation of the rotary input shaft via the gear mechanism.

It is desirable for the non-circular cross section portion to include at least one surface which is orthogonal to a radial direction of the rotary input shaft.

It is desirable for the shape of the non-circular cross section portion to be a polygon in cross section.

The non-circular cross section portion can include at least one pair of inclined surfaces which are symmetrical with respect to a line extending in a radial direction of the rotary input shaft.

The manual operating ring can be a focusing ring, the lens group being moved along the optical axis to perform a focusing operation when the focusing ring is manually rotated.

The manual operating ring can be a zoom ring, the lens group being moved along the optical axis to perform a zooming operation when the zoom ring is manually rotated.

The shape of the non-circular cross section portion can be a square in cross section.

The shape of the non-circular cross section portion can be triangular in cross section.

The lens barrel can be an interchangeable lens barrel which is detachably attached to a camera body.

It is desirable for the rotary input shaft to be driven by a drive system provided in the camera body.

It is desirable for the gear mechanism to include an inner circumferential gear formed on an inner peripheral surface of the manual operating ring.

The biasing device can include a compression coil spring fitted on the rotary input shaft.

In another embodiment, a lens barrel is provided, including a stationary member; a rotary input shaft which is rotatably supported by the stationary member to extend parallel to an optical axis, and includes a first orthogonal surface lying in a plane orthogonal to an axis of the rotary input shaft; a manual operating ring which is rotatably supported by the stationary member, and is rotated by a rotation of the rotary input shaft via a gearing mechanism; at least one optical element which is movable along the optical axis by a rotation of the manual operating ring a hollow-cylindrical output gear having a cylindrical inner peripheral surface in which the rotary input shaft is fitted so that the hollow-cylindrical output gear can freely rotate on the rotary input shaft, and an outer gear portion which is formed on an outer peripheral surface of the hollow-cylindrical output gear to be concentric with the cylindrical inner peripheral surface, the outer gear portion serving as a part of the gear mechanism; a second orthogonal surface formed on a support portion of the stationary member to lie in a plane orthogonal to the axis of the rotary input shaft and to face the first orthogonal surface, the support portion supporting the rotary input shaft so that the rotary input shaft can freely rotate on the axis thereof; a non-circular cross section portion formed on the rotary input shaft between the first orthogonal surface and the second orthogonal surface to form at least one accommodation space between the rotary input shaft and the cylindrical inner peripheral surface; at least one ball installed in the accommodation space; and a biasing device which biases the rotary input shaft in a direction along the axis thereof to reduce a space between the first orthogonal surface and the second orthogonal surface so that the ball are held tight between the first orthogonal surface and the second orthogonal surface. The non-circular cross section portion is shaped so that the rotation of the rotary input shaft is transferred to the hollow-cylindrical output gear via the ball, to which the rotation of the rotary input shaft is given via the first orthogonal surface, when the rotary input shaft is driven to rotate.

It is desirable for the stationary member to be a stationary ring.

The optical element can be moved by a rotation of the manual operating ring when the manual operating ring is manually rotated or a rotation of the manual operating ring when the manual operating ring is rotated by the rotation of the rotary input shaft via the gear mechanism.

It is desirable for the non-circular cross section portion to include at least one surface which is orthogonal to a radial direction of the rotary input shaft.

It is desirable for the shape of the non-circular cross section portion to be a polygon in cross section.

The non-circular cross section portion can include at least one pair of inclined surfaces which are symmetrical with respect to a line extending in a radial direction of the rotary input shaft.

The manual operating ring can be a focusing ring, the lens group being moved along the optical axis to perform a focusing operation when the focusing ring is manually rotated.

The manual operating ring can be a zoom ring, the lens group being moved along the optical axis to perform a zooming operation when the zoom ring is manually rotated.

The shape of the non-circular cross section portion can be a square in cross section.

The shape of the non-circular cross section portion can be triangular in cross section.

The lens barrel can be an interchangeable lens barrel which is detachably attached to a camera body.

It is desirable for the rotary input shaft to be driven by a drive system provided in the camera body.

It is desirable for the gear mechanism to include an inner circumferential gear formed on an inner peripheral surface of the manual operating ring.

The biasing device can include a compression coil spring fitted on the rotary input shaft.

In another embodiment, a lens barrel is provided including a stationary member; at least one optical element guided along an optical axis; a manual operating ring which is rotatably supported by the stationary member; a drive ring which is rotatably supported by the stationary member, a rotation of the drive ring causing the optical element to move along the optical axis; a first rotary input shaft which is rotatably supported by the stationary member to extend parallel to the optical axis, and is rotated by a driving force received from a drive system of a camera body; a first hollow-cylindrical output gear which is rotatably fitted on the first rotary input shaft, the first hollow-cylindrical output gear including a first outer gear portion formed on an outer peripheral surface of the first hollow-cylindrical output gear to be engaged with at least one drive-ring rotating gear for rotating the drive ring; a second rotary input shaft which is rotatably supported by the stationary member to extend parallel to the optical axis; a second hollow-cylindrical output gear which is rotatably fitted on the second rotary input shaft, the second hollow-cylindrical output gear including a second outer gear portion formed on an outer peripheral surface of the second hollow-cylindrical output gear to be engaged with the drive-ring rotating gear; a third outer gear portion formed on the second rotary input shaft to be engaged with the drive-ring rotating gear, the second rotary input shaft being rotated via the third outer gear potion and the drive-ring rotating gear when the manual operating ring is manually rotated; a first one-way rotational transfer mechanism which allows rotation of the first rotary input shaft to be transferred to the first hollow-cylindrical output gear while preventing rotation of the first hollow-cylindrical output gear to be transferred to the first rotary input shaft; and a second one-way rotational transfer mechanism which allows rotation of the second rotary input shaft to be transferred to the second hollow-cylindrical output gear while preventing rotation of the second hollow-cylindrical output gear to be transferred to the second rotary input shaft.

It is desirable for the stationary member to include a stationary ring.

The first one-way rotational transfer mechanism can include a first orthogonal surface formed on the first rotary input shaft to lie in a plane orthogonal to an axis of the first rotary input shaft; a first cylindrical inner peripheral surface formed on the first hollow-cylindrical output gear so that the first rotary input shaft is fitted in the first cylindrical inner peripheral surface to be freely rotatable relative to the first hollow-cylindrical output gear; a first non-circular cross section portion formed on the first rotary input shaft to be adjacent to the first orthogonal surface to form at least one first accommodation space between the first rotary input shaft and the first cylindrical inner peripheral surface; at least one first ball installed in the first accommodation space; and a first biasing device for making the first orthogonal surface and the first ball come into pressing contact with each other. The first non-circular cross section portion is shaped so that the rotation of the first rotary input shaft is transferred to the first hollow-cylindrical output gear via the first ball to which the rotation of the first rotary input is given from the first orthogonal surface when the first rotary input shaft is driven to rotate. The second one-way rotational transfer mechanism can include a second orthogonal surface formed on the second rotary input shaft to lie in a plane orthogonal to an axis of the second rotary input shaft; a second cylindrical inner peripheral surface formed on the second hollow-cylindrical output gear so that the second rotary input shaft is fitted in the second cylindrical inner peripheral surface to be freely rotatable relative to the second hollow-cylindrical output gear; a second non-circular cross section portion formed on the second rotary input shaft to be adjacent to the second orthogonal surface to form at least one second accommodation space between the second rotary input shaft and the second cylindrical inner peripheral surface; at least one second ball installed in the second accommodation space; and a second biasing device for making the second orthogonal surface and the second ball come into pressing contact with each other. The second non-circular cross section portion is shaped so that the rotation of the second rotary input shaft is transferred to the second hollow-cylindrical output gear via the second ball to which the rotation of the second rotary input is given from the second orthogonal surface when the second rotary input shaft is driven to rotate.

It is desirable for the first one-way rotational transfer mechanism to include a first orthogonal surface formed on the first rotary input shaft to lie in a plane orthogonal to an axis of the first rotary input shaft; a first cylindrical inner peripheral surface formed on the first hollow-cylindrical output gear so that the first rotary input shaft is fitted in the first cylindrical inner peripheral surface to be freely rotatable relative to the first hollow-cylindrical output gear; a second orthogonal surface formed on a support portion of the stationary member to lie in a plane orthogonal to the axis of the first rotary input shaft and to face the first orthogonal surface, the support portion supporting the first rotary input shaft so that the first rotary input shaft can freely rotate on the axis thereof; a first non-circular cross section portion formed on the first rotary input shaft between the first orthogonal surface and the second orthogonal surface to form at least one first accommodation space between the first rotary input shaft and the first cylindrical inner peripheral surface; at least one first ball installed in the first accommodation space; and a first biasing device which biases the first rotary input shaft in a direction along the axis thereof to reduce a space between the first orthogonal surface and the second orthogonal surface so that the first ball are held tight between the first orthogonal surface and the second orthogonal surface. The first non-circular cross section portion is shaped so that the rotation of the first rotary input shaft is transferred to the first hollow-cylindrical output gear via the first ball to which the rotation of the first rotary input is given from the first orthogonal surface when the first rotary input shaft is driven to rotate. The second one-way rotational transfer mechanism can include a third orthogonal surface formed on the second rotary input shaft to lie in a plane orthogonal to an axis of the second rotary input shaft; a second cylindrical inner peripheral surface formed on the second hollow-cylindrical output gear so that the second rotary input shaft is fitted in the second cylindrical inner peripheral surface to be freely rotatable relative to the second hollow-cylindrical output gear; a fourth orthogonal surface formed on the support portion of the stationary member to lie in a plane orthogonal to the axis of the second rotary input shaft and to face the third orthogonal surface, the support portion supporting the second rotary input shaft so that the second rotary input shaft can freely rotate on the axis thereof; a second non-circular cross section portion formed on the second rotary input shaft between the third orthogonal surface and the fourth orthogonal surface to form at least one second accommodation space between the second rotary input shaft and the second cylindrical inner peripheral surface; at least one second ball installed in the second accommodation space; and a second biasing device which biases the second rotary input shaft in a direction along the axis thereof to reduce a space between the third orthogonal surface and the fourth orthogonal surface so that the second ball are held tight between the third orthogonal surface and the fourth orthogonal surface. The second non-circular cross section portion is shaped so that the rotation of the second rotary input shaft is transferred to the second hollow-cylindrical output gear via the second ball to which the rotation of the second rotary input is given from the third orthogonal surface when the second rotary input shaft is driven to rotate.

It is desirable for the first orthogonal surface and the second orthogonal surface to lie in a common surface of the support portion.

It is desirable for the first non-circular cross section portion to include at least one first surface orthogonal to a radial direction of the first rotary input shaft, and the second non-circular cross section portion to include at least one second surface orthogonal to a radial direction of the second rotary input shaft.

It is desirable for each of the first non-circular cross section portion and the second non-circular cross section portion to be in the shape of a polygon in cross section.

The first non-circular cross section portion can include at least one first pair of inclined surfaces which are symmetrical with respect to a line extending in a radial direction of the first rotary input shaft, and the second non-circular cross section portion can include at least one second pair of inclined surfaces which are symmetrical with respect to a line extending in a radial direction of the second rotary input shaft.

The manual operating ring can be a focusing ring, the lens group being moved along the optical axis to perform a focusing operation when the focusing ring is manually rotated.

The manual operating ring can be a zoom ring, the lens group being moved along the optical axis to perform a zooming operation when the zoom ring is manually rotated.

The shape of each of the first non-circular cross section portion and the second non-circular cross section portion can be a square in cross section.

The shape of each of the first non-circular cross section portion and the second non-circular cross section portion can be triangular in cross section.

The lens barrel can be an interchangeable lens barrel which is detachably attached to a camera body.

The first biasing device can be a first compression coil spring fitted on the rotary input shaft, and the second biasing device can be a second compression coil spring fitted on the rotary input shaft.

In another embodiment, an interchangeable lens is provided, including a photographing optical system including at least one movable lens group guided along an optical axis; a mount ring a rear end of which is detachably attached to a camera body; a drive shaft which extends parallel to the optical axis, and includes an orthogonal surface lying in a plane orthogonal to an axis of the drive shaft, a rear end of the drive shaft being coupled with a drive system provided in the camera body when the rear end of the mount ring is properly attached to the camera body; a manual operating ring which is rotated by a rotation of the drive shaft via a gear mechanism, the movable lens group being moved along the optical axis by a rotation of the manual operating ring; a hollow-cylindrical output gear having a cylindrical inner peripheral surface in which the drive shaft is fitted so that the hollow-cylindrical output gear can freely rotate on the drive shaft, and an outer gear portion which is formed on an outer peripheral surface of the hollow-cylindrical output gear to be concentric with the cylindrical inner peripheral surface, the outer gear portion serving as a part of the gear mechanism; a non-circular cross section portion formed on the drive shaft to be adjacent to the orthogonal surface to form a plurality of accommodation spaces between the drive shaft and the cylindrical inner peripheral surface; a plurality of balls installed in the plurality of accommodation spaces, respectively; and a biasing device for making the orthogonal surface and the plurality of balls come into pressing contact with each other. The non-circular cross section portion can be shaped so that the rotation of the drive shaft is transferred to the hollow-cylindrical output gear via the plurality of balls, to which the rotation of the rotary input is given via the orthogonal surface, when the drive shaft is driven to rotate.

The present disclosure relates to subject matter contained in Japanese Patent Applications Nos. 2002-310441 and 2002-310442 (both filed on Oct. 25, 2002) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
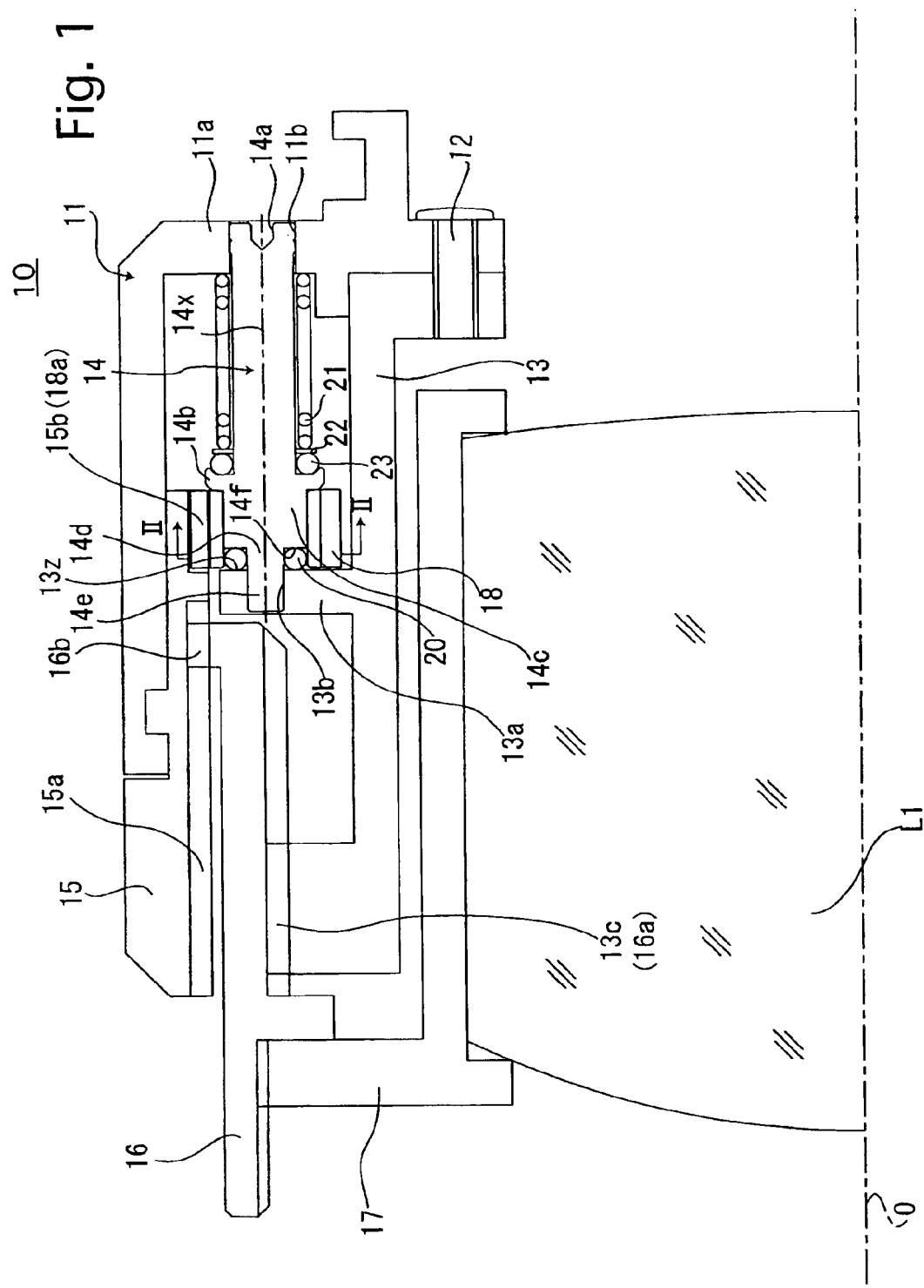
FIG. 1 is a longitudinal cross sectional view of an embodiment of a power/manual lens barrel according to a first aspect of the present invention, showing an upper half of the power/manual lens barrel from the optical axis thereof.
Figure 3:
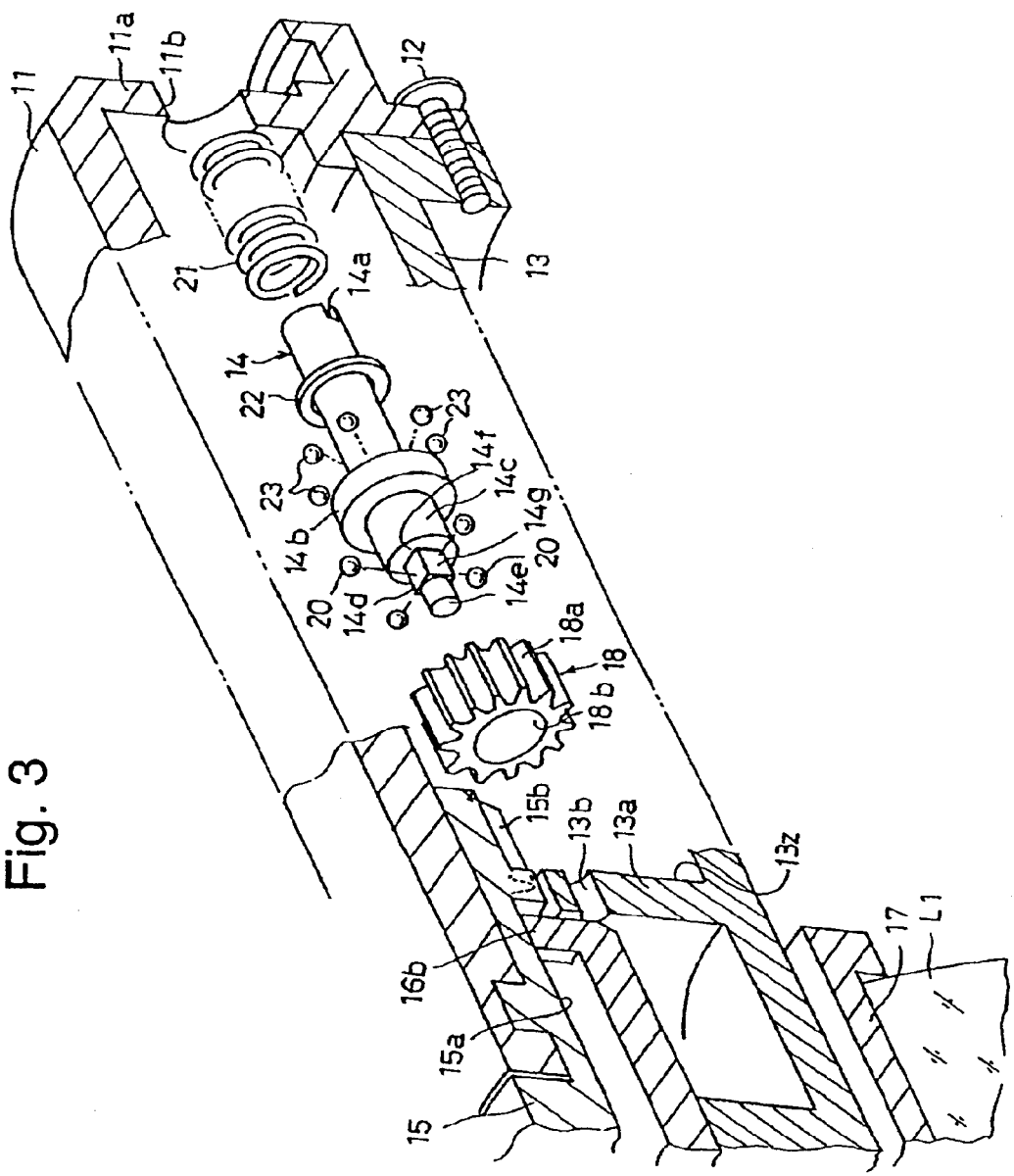
FIG. 3 is an exploded perspective view, partly in cross section, of a fundamental portion of the power/manual lens barrel shown in FIG. 1.

FIG. 1 shows an embodiment of an interchangeable AF lens, which serves as a power/manual lens barrel, according to a first aspect of the present invention. The AF lens 10 is provided at a rear end thereof with a mount ring (stationary ring/stationary member) 11 which is detachably attached to a camera body (not shown). As shown in FIGS. 1 and 3, the AF lens 10 is provided inside the mount ring 11 with an inner stationary ring 13 which is fixed to the mount ring 11 by a set screw 12. The AF lens 10 is provided therein between the mount ring 11 and the inner stationary ring 13 with a rotary input shaft 14 having an axis 14x parallel to an optical axis O. A front bearing hole 13b and a rear bearing hole 11b are coaxially formed on an outer flange 13a of the inner stationary ring 13 and a rear end wall 11a of the mount ring 11, respectively. Front and rear ends of the rotary input shaft 14 are respectively fitted in the front bearing hole 13b and the rear bearing hole 11b to be supported thereby to be freely rotatable on the axis of the rotary input shaft 14. The rear end of the rotary input shaft 14 is provided with a rotation transfer slot 14a via which the rear end of the rotary input shaft 14 is coupled to a front end of a rotary output shaft driven by an AF motor (not shown) provided in the camera body to which the AF lens 10 is mounted so that the rotary input shaft 14 can be driven by the AF motor when the AF lens 10 is mounted to the camera body.

The AF lens 10 is provided in the vicinity of the front end of the mount ring 11 with a focusing ring (manual operating ring) 15 which is supported by the mount ring 11 to be freely rotatable about the optical axis O without moving along the optical axis O with respect to the mount ring 11. The AF lens 10 is provided between the inner stationary ring 13 and the focusing ring 15 with a focusing lens group moving ring 16. The focusing lens group moving ring 16 is provided on an inner peripheral surface thereof with a female thread portion 16a while the inner stationary ring 13 is provided on an outer peripheral surface thereof with a male thread portion 13c which is engaged with the female thread portion 16a of the focusing lens group moving ring 16 so that the focusing lens group moving ring 16 moves along the optical axis O when rotating with respect to the inner stationary ring 13. The focusing ring 15 is provided on an inner peripheral surface thereof with a rotation transfer groove 15a which extends parallel to the optical axis O. The AF lens 10 is provided inside the inner stationary ring 13 with a first lens group support frame 17 which is fixed to the focusing lens group moving ring 16. A front portion of the first lens group support frame 17 is screw-engaged with a front portion of the focusing lens group moving ring 16 to be fixed thereto. A focusing lens group L1 is fixed to the first lens group support frame 17 to be supported thereby.

The focusing lens group moving ring 16 is provided on an outer peripheral surface thereof at the rear end of the focusing lens group moving ring 16 with a rotation transfer projection 16b which projects radially outwards to be engaged in the rotation transfer groove 15a. Therefore, if the focusing ring 15 is manually rotated, the rotation of the focusing ring 15 is transferred to the focusing lens group moving ring 16 via the engagement of the rotation transfer projection 16b with the rotation transfer groove 15a to move the focusing lens group moving ring 16 along the optical axis O while rotating the focusing lens group moving ring 16 about the optical axis O due to the engagement of the male thread portion 13c with the female thread portion 16a. The AF lens 10 is provided with a photographing optical system having a plurality of lens groups including the focusing lens group L1. Only the focusing lens group L1 is shown in FIG. 1 for the purpose of illustration.

The focusing ring 15 is provided on an inner peripheral surface in the close vicinity of the rear end of the focusing ring 15 with an inner circumferential gear 15b. A hollow-cylindrical output gear 18 is rotatably fitted on the rotary input shaft 14, and is provided on an outer peripheral surface of the hollow-cylindrical output gear 18 with an outer gear portion 18a which is in mesh with the inner circumferential gear 15b of the focusing ring 15. The rotary input shaft 14 and the hollow-cylindrical output gear 18 are fundamental elements of a one-way rotational transfer mechanism which allows rotation of the rotary input shaft 14 to be transferred to the hollow-cylindrical output gear 18, regardless of the direction of the rotation of the rotary input shaft 14, while preventing rotation of the hollow-cylindrical output gear 18 from being transferred to the rotary input shaft 14 when a rotation is given to the hollow-cylindrical output gear 18. The inner circumferential gear 15b and the hollow-cylindrical output gear 18 (outer gear portion 18a) constitute a gear mechanism for the one-way rotational transfer mechanism. The one-way rotational transfer mechanism will be hereinafter discussed in detail.

The rotary input shaft 14 is provided with an outer flange 14b, a cylindrical portion 14c, a quadratic prism portion 14d and a supported end 14e in this order from a middle portion of the rotary input shaft 14 to the front end thereof. The cylindrical portion 14c is fitted in a cylindrical inner peripheral surface 18b of the hollow-cylindrical output gear 18 so that the hollow-cylindrical output gear 18 can freely rotate on the cylindrical portion 14c. The quadratic prism portion 14d has a square cross section to serve as a non-circular cross section portion, and also has an even thickness in the axial direction (horizontal direction as viewed in FIG. 1) of the rotary input shaft 14. The supported end 14e is rotatably fitted into the front bearing hole 13b. The quadratic prism portion 14d has a square shape in cross section, the center of which is coincident with the axis 14x of the rotary input shaft 14 as viewed from one end of the axis 14x. The outer peripheral surface of the quadratic prism portion 14d is provided with four contact surfaces 14g arranged at regular intervals of 90 degrees about the axis 14x (see FIG. 2). Each contact surface 14g is a flat surface, and extends orthogonal to a radial direction of the rotary input shaft 14. The cylindrical portion 14c is provided, on one side thereof adjacent to the quadratic prism portion 14d (i.e., the left side as viewed in FIG. 1), with an orthogonal surface 14f which lies in a plane orthogonal to the axis 14x of the rotary input shaft 14. The orthogonal surface 14f serves as a first orthogonal surface. The outer flange 13a of the inner stationary ring 13 is provided, on one side thereof facing the orthogonal surface 14f (i.e., the right side as viewed in FIG. 1), with an orthogonal end surface 13z which lies in a plane orthogonal to the axis 14x of the rotary input shaft 14. Namely, the orthogonal surface 14f and the orthogonal end surface 13z extend parallel to each other. The orthogonal end surface 13z serves as a second orthogonal surface which faces the first orthogonal surface, i.e., the orthogonal surface 14f.

Figure 2:
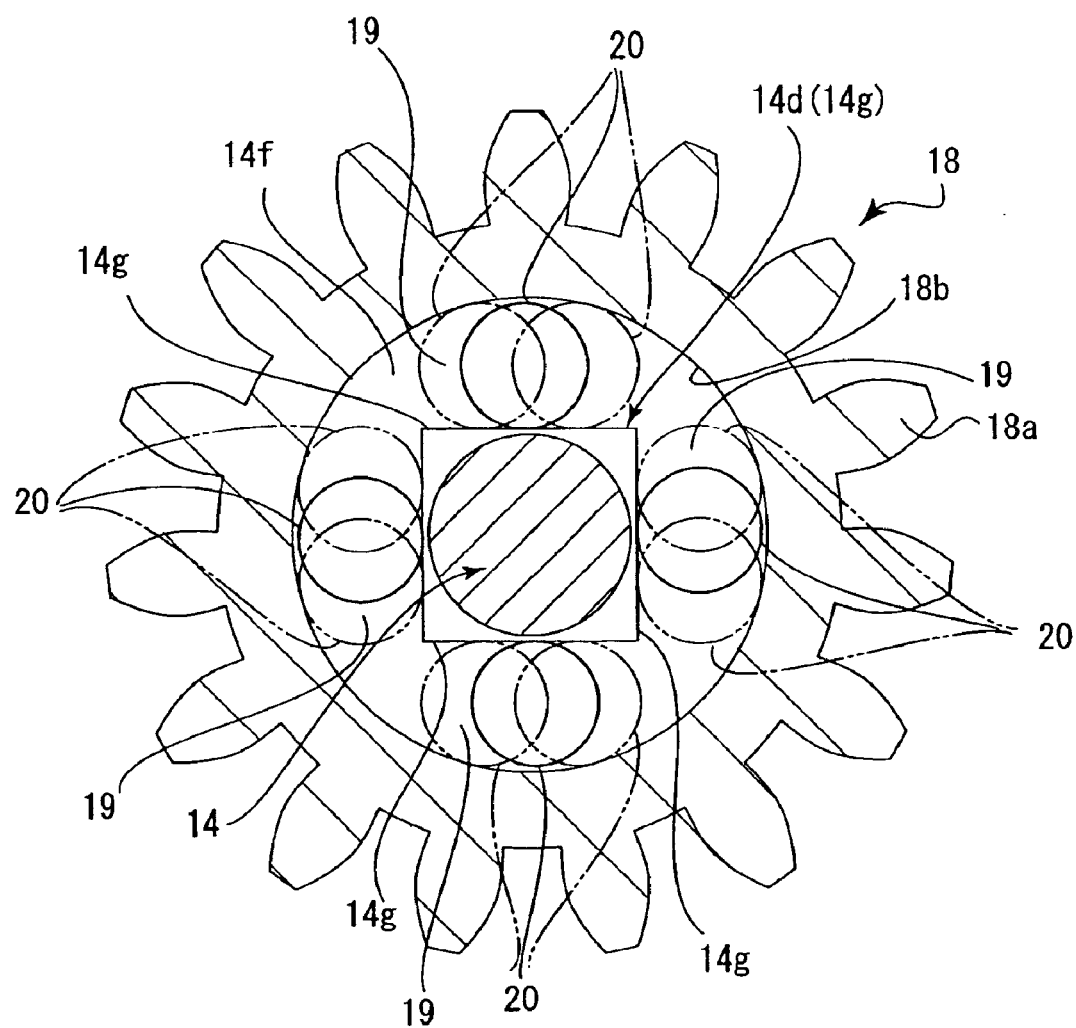
FIG. 2 is a cross sectional view taken along II—II line shown in FIG. 1, showing a first embodiment of a fundamental portion (including a non-circular cross section portion) of a one-way rotational transfer mechanism according to the first aspect of the present invention.

The space between the orthogonal end surface 13z of the outer flange 13a and the orthogonal surface 14f of the cylindrical portion 14c around the quadratic prism portion 14d is surrounded by the cylindrical inner peripheral surface 18b of the hollow-cylindrical output gear 18 to form four accommodation spaces 19 (see FIG. 2). In the embodiment of the one-way rotational transfer mechanism of the AF lens 10 shown in FIGS. 1 through 3, the number of accommodation spaces 19 formed around the quadratic prism portion 14d is four, and a steel ball 20 is installed in each of the four accommodation spaces 19. The steel balls 20 have a diameter smaller than the maximum width of each accommodation space 19 in a radial direction of the rotary input shaft 14 so that each steel ball 20 can move in the associated accommodation space 19. Each steel ball 20 is a precision engineered hard steel ball. Hardened steel balls of a conventional ball bearing can be used as the steel balls 20.

A compression coil spring (biasing device) 21 is fitted on the rotary input shaft 14 to be positioned between the outer flange 14b of the rotary input shaft 14 and the rear end wall 11a of the mount ring 11. The compression coil spring 21 biases the input rotary shaft 14 along the axis 14x thereof in a direction to move the orthogonal surface 14f (first orthogonal surface) of the outer flange 14b toward the orthogonal end surface 13z (second orthogonal surface) of the outer flange 13a so that the four steel balls 20 are held tight between the orthogonal surface 14f and the orthogonal end surface 13z. The AF lens 10 is provided between the outer flange 14b and the compression coil spring 21 with a washer 22, and is further provided between the outer flange 14b and the washer 22 with a plurality of steel balls 23. The washer 22 and the plurality of steel balls 23 serve as a device for reducing surface frictional resistance between the outer flange 14b and the compression coil spring 21. As shown in FIG. 1, the outer edge of the outer flange 14b is somewhat bent rearwardly inwards to prevent the plurality of steel balls 23 from coming off.

Operations of the AF lens 10 will be discussed hereinafter. An important aspect in the structure of the one-way rotational transfer mechanism before it operates is that the orthogonal surface 14f of the cylindrical portion 14c and each steel ball 20 are in intimate contact with each other via the spring force of the compression coil spring 21; namely, each steel ball 20 is always sandwiched between the orthogonal surface 14f and the orthogonal end surface 13z. If the rotary input shaft 14 is rotated by the AF motor provided in the associated camera body to perform an autofocusing operation, the orthogonal surface 14f rotates. This rotation of the orthogonal surface 14f causes each steel ball 20 to rotate due to the frictional contact between each steel ball 20 with the orthogonal surface 14f. Accordingly, each steel ball 20 moves from a neutral position thereof (indicated by a solid line in FIG. 2), in a rotational direction opposite to the rotational direction of the rotary input shaft 14 with respect to the orthogonal surface 14f, to move into one of wedge-shaped opposite ends which are formed in the associated accommodation space 19 between the associated contact surface 14g of the quadratic prism portion 14d and the cylindrical inner peripheral surface 18b of the hollow-cylindrical output gear 18. As a result, each steel ball 20 comes into firm contact with the cylindrical inner peripheral surface 18b to thereby transfer rotation of the rotary input shaft 14 to the hollow-cylindrical output gear 18 via the steel balls 20 and the cylindrical inner peripheral surface 18b of the hollow-cylindrical output gear 18. This action occurs regardless of the rotational direction of the rotary input shaft 14. Namely, rotation of the rotary input shaft 14 in either rotational direction can be transferred to the hollow-cylindrical output gear 18. Since the outer gear portion 18a of the hollow-cylindrical output gear 18 is engaged with the inner circumferential gear 15*b* of the focusing ring 15, rotation of the hollow-cylindrical output gear 18 is transferred to the focusing ring 15 regardless of the rotational direction of the hollow-cylindrical output gear 18 to rotate the focusing ring 15. This rotation of the focusing ring 15 causes the focusing lens group moving ring 16 (to which the first lens group support frame 17 and the focusing lens group L1 are fixed) to move along the optical axis O while rotating about the optical axis O as described above to perform a focusing operation (autofocusing operation).

On the other hand, if the focusing ring 15 is manually rotated to perform a focusing operation (manual focusing operation), the rotation of the focusing ring 15 is transferred to the hollow-cylindrical output gear 18 via the engagement of the outer gear portion 18*a* with the inner circumferential gear 15*b* to rotate the hollow-cylindrical output gear 18. During this rotation of the hollow-cylindrical output gear 18, each steel ball 20 merely rotates in the associated accommodation space 19 because the steel ball 20 is merely in point contact with the cylindrical inner peripheral surface 18*b* of the hollow-cylindrical output gear 18 even if the steel ball 23 is in contact with the cylindrical inner peripheral surface 18*b*. Therefore, no rotation of the hollow-cylindrical output gear 18 is transferred to the rotary input shaft 14 even if a rotation is given to the hollow-cylindrical output gear 18.

Namely, when the rotary input shaft 14 is rotated, each steel ball 20 is engaged with one of the wedge-shaped opposite ends that are formed between the associated contact surface 14*g* and the cylindrical inner peripheral surface 18*b* because the rotation of the rotary input shaft 14 is transferred to each steel ball 20 via the orthogonal surface 14*f*; consequently, the rotation of the rotary input shaft 14 is transferred to the hollow-cylindrical output gear 18. However, when the hollow-cylindrical output gear 18 is rotated, very little force or substantially no force is generated, i.e., sufficient force for causing each steel ball 20 to be engaged with one of the wedge-shaped opposite ends is not generated because the rotation of the hollow-cylindrical output gear 18 is transferred to each steel ball 20 via the cylindrical inner peripheral surface 18*b*. Consequently, the rotation of the hollow-cylindrical output gear 18 is not transferred to the rotary input shaft 14, i.e., to the AF motor in the associated camera body via the rotary input shaft 14. Accordingly, a manual focusing operation can be performed simply by rotating the focusing ring 15 manually without requiring any special switching mechanism or operation for performing the manual focusing operation.

Figure 4:
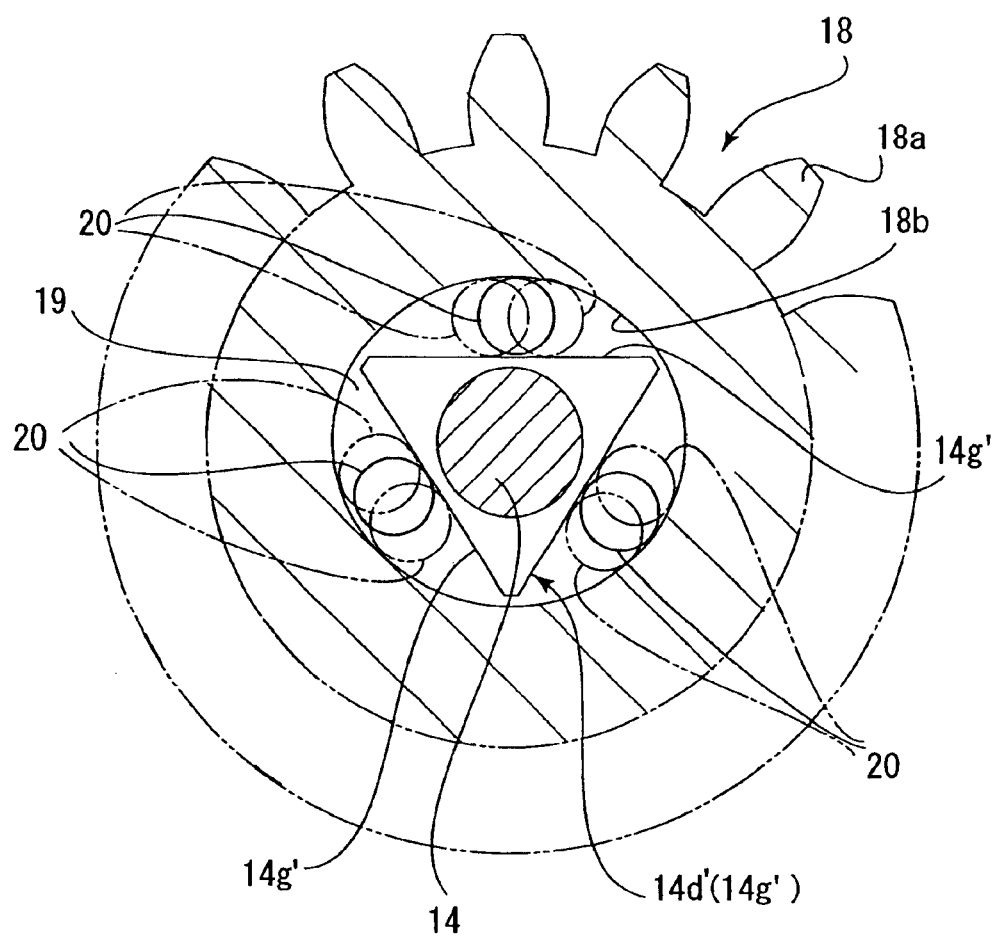
FIG. 4 is a cross sectional view of a second embodiment of the fundamental portion (including a non-circular cross section portion) of the one-way rotational transfer according to the first aspect of the present invention.
Figure 5:
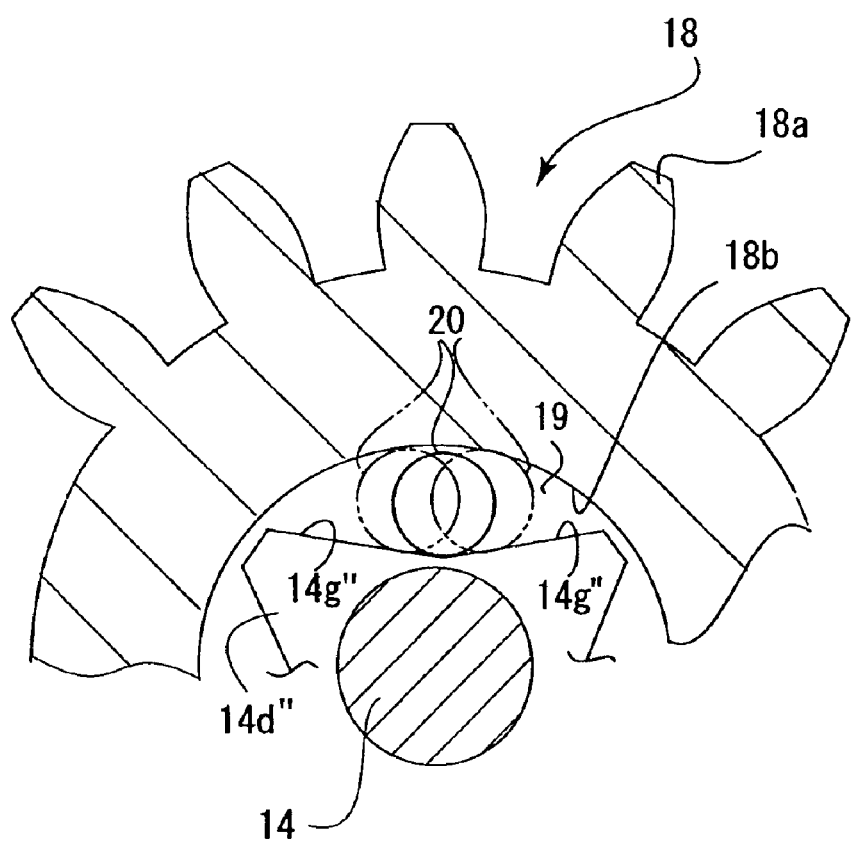
FIG. 5 is a fragmentary cross sectional view of a third embodiment of the fundamental portion (a non-circular cross section portion) of the one-way rotational transfer mechanism according to the first aspect of the present invention.

If it is desired to change the number of the accommodation spaces 19 (the number of the steel balls 20), a polygonal prism portion other than a quadratic prism portion such as the quadratic prism portion 14*d* only needs to be formed on the rotary input shaft 14, which is the simplest way of changing the number of the accommodation spaces 19. FIG. 4 shows another embodiment (second embodiment) of the non-circular cross section portion of the rotary input shaft 14 according to the first aspect of the present invention. In this embodiment, the non-circular cross section portion of the rotary input shaft 14 is formed as a triangular prism portion 14*d'* having an even thickness in the axial direction of the rotary input shaft 14. The outer peripheral surface of the triangular prism portion 14*d'* is provided with three contact surfaces 14*g'* arranged at regular intervals of 120 degrees about the axis 14*x* of the rotary input shaft 14. Theoretically, the number of the accommodation spaces 19 (the number of the steel balls 20) can be one if balance does not have to be taken into account. Although each contact surface 14*g'* is even and extends orthogonal to a radial direction of the rotary input shaft 14 in each of the embodiments shown in FIGS. 2 and 4, each contact surface 14*g'* can be modified as an uneven surface as shown in another embodiment (third embodiment shown in FIG. 5) of the non-circular cross section portion of the rotary input shaft 14 according to the first aspect of the present invention. In this embodiment, each contact surface (of a polygonal prism portion 14*d''*) which is in contact with the associated steel ball 20 is formed as a pair of inclined surfaces 14*g''* which are symmetrical with respect to a line extending in a radial direction of the rotary input shaft 14. According to this embodiment shown in FIG. 5, the internal angles of the aforementioned wedge-shaped opposite ends can be easily determined and adjusted.

In each embodiment described above, the outer gear portion 18*a* of the hollow-cylindrical output gear 18 is directly engaged with the inner circumferential gear 15*b* of the focusing ring 15 for the purpose of simplifying the structure of each embodiment. However, the mechanism for transferring rotation of the hollow-cylindrical output gear 18, that is coaxial to the rotary input shaft 14, to the focusing ring 15 and the mechanism for moving the focusing lens group L1 along the optical axis O by rotation of the focusing ring 15 are not limited solely to those described above, but can be any other mechanism.

The first aspect of the present invention can be applied to not only an AF lens such as the above described embodiment of the AF lens 10 but also to a power zoom lens, at least one movable lens group of which moves by rotating a manual operating ring to perform a zooming operation. For instance, such a power zoom lens can be provided with a mechanism for moving at least two lens groups (focal-length varying lens groups) along the optical axis thereof by a rotation of a manual operating ring (which corresponds to the focusing ring 15) or a lens group moving ring (which corresponds to the focusing lens group moving ring 16). This type of mechanism is well known in the art.

As can be understood from the above descriptions, according to the first aspect of the present invention, a power/manual lens barrel is achieved, wherein rotation of the rotary input shaft is transferred to the manual operating ring when the rotary input shaft is driven by motor while rotation of the manual operating ring is prevented from being transferred to the rotary input shaft so that the motor cannot be rotated by the rotation of the manual operating ring when the manual operating ring is manually rotated, without requiring any special switching mechanism or operation.

Figure 6:
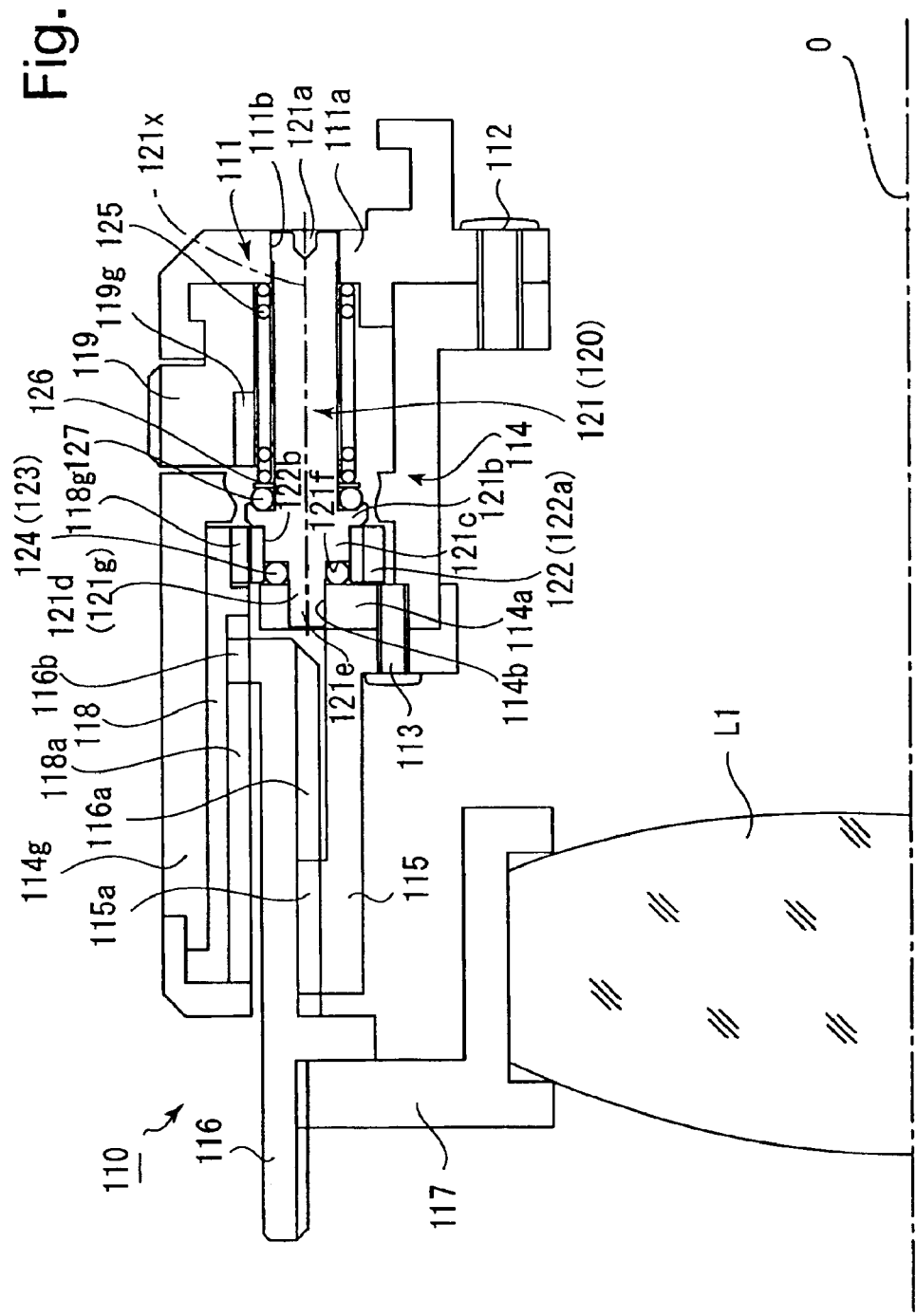
FIG. 6 is a longitudinal cross sectional view of an embodiment of a power/manual lens barrel according to a second aspect of the present invention, showing an upper half of the power/manual lens barrel from the optical axis thereof.
Figure 7:
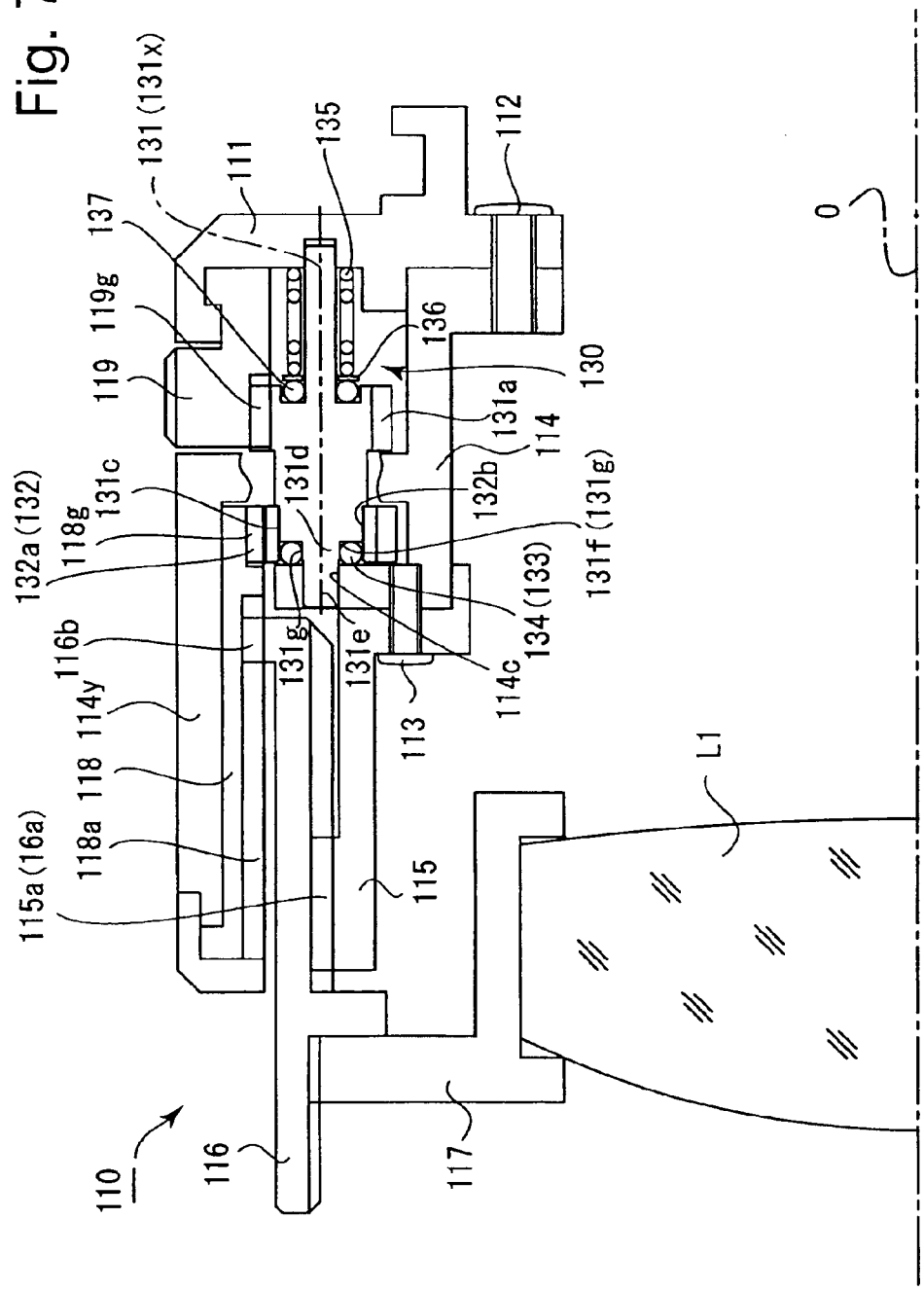
FIG. 7 is a view similar to that of FIG. 6, showing a different cross section of the power/manual lens barrel shown in FIG. 6.

FIGS. 6 and 7 show an embodiment of an interchangeable AF lens, which serves as a power/manual lens barrel, according to a second aspect of the present invention. The AF lens 110 is provided at a rear end thereof with a mount ring (stationary ring) 111 which is detachably attached to a camera body (not shown). The AF lens 110 is provided with a stationary ring 114 which is fixed to the mount ring 111 by a set screw 112. The AF lens 110 is provided, inside the mount ring 111 immediately in front of the stationary ring 114, with an inner stationary ring 115 which is fixed to a front end of the stationary ring 114 by a set screw 113. The AF lens 110 is provided on the inner stationary ring 115 with a focusing lens group moving ring 116. The focusing lens group moving ring 116 is provided on an inner peripheral surface thereof with a female thread portion 116*a* while the inner stationary ring 115 is provided on an outer peripheral surface thereof with a male thread portion 115*a* which is engaged with the female thread portion 116*a* of the focusing lens group moving ring 116 so that the focusing lens group moving ring 116 moves along the optical axis O when rotating with respect to the inner stationary ring 115. The AF lens 110 is provided inside the inner stationary ring 115 with a first lens group support frame 117 which is fixed to the focusing lens group moving ring 116. A front portion of the first lens group support frame 117 is screw-engaged with a front portion of the focusing lens group moving ring 116 to be fixed thereto. A focusing lens group L1 is fixed to the first lens group support frame 117 to be supported thereby.

The stationary ring 114 is provided with an external ring portion 114y. The AF lens 110 is provided with a drive ring 118 which is fitted in the external ring portion 114y to be freely rotatable about the optical axis O without moving along the optical axis O with respect to the external ring portion 114y. The drive ring 118 is provided on an inner peripheral surface thereof with a rotation transfer groove 118a which extends parallel to the optical axis O. The focusing lens group moving ring 116 is provided on an outer peripheral surface thereof at the rear end of the focusing lens group moving ring 116 with a rotation transfer projection 116b which projects radially outwards to be engaged in the rotation transfer groove 118a. Therefore, if a rotation is given to the drive ring 118, the rotation of the drive ring 118 is transferred to the focusing lens group moving ring 116 via the engagement of the rotation transfer projection 116b with the rotation transfer groove 118a to move the focusing lens group moving ring 116 along the optical axis O while rotating the focusing lens group moving ring 116 about the optical axis O due to the engagement of the male thread portion 115a with the female thread portion 116a. The AF lens 110 is provided with a photographing optical system having a plurality of lens groups including the focusing lens group L1. Only the focusing lens group L1 is shown in FIGS. 6 and 7 for the purpose of illustration.

The AF lens 110 is provided between the external ring portion 114y and a rear end wall 111a of the mount ring 111 with a focusing ring (manual operating ring) 119. The focusing ring 119 is supported by the mount ring 111 to be freely rotatable about the optical axis O without moving along the optical axis O with respect to the mount ring 111. The stationary ring 114 is provided at a front end thereof with an outer flange 114a which projects radially outwards. The AF lens 110 is provided therein between the outer flange 114a of the stationary ring 114 and the rear end wall 111a of the mount ring 111 with a first rotary input shaft 121 having an axis 121x parallel to the optical axis O. A front bearing hole 114b and a rear bearing hole 111b are coaxially formed on the outer flange 114a and the rear end wall 111a of the mount ring 111, respectively. Front and rear ends of the first rotary input shaft 121 are respectively fitted in the front bearing hole 114b and the rear bearing hole 111b to be supported thereby to be freely rotatable on the axis 121x of the first rotary input shaft 121. The rear end of the first rotary input shaft 121 is provided with a rotation transfer slot 121a via which the rear end of the first rotary input shaft 121 is coupled to a front end of a rotary output shaft driven by an AF motor provided in the camera body to which the AF lens 110 is mounted so that the first rotary input shaft 121 can be driven by the AF motor when the AF lens 110 is mounted to the camera body.

The AF lens 110 is provided therein with a mechanism which allows rotation of the first rotary input shaft 121 to be transferred to the drive ring 118 to move the focusing lens group moving ring 116 (to which the first lens group support frame 17 and the focusing lens group L1 are fixed) along the optical axis O while preventing the focusing ring 119 from rotating when a rotation is given to the first rotary input shaft 121, and also allows rotation of the focusing ring 119 to be transferred to the drive ring 118 to move the focusing lens group moving ring 116 along the optical axis O while preventing the rotation of the focusing ring 119 from being transferred to the first rotary input shaft 121 when a rotation is given to the focusing ring 119. This mechanism is composed of a first one-way rotational transfer mechanism 120 and a second one-way rotational transfer mechanism 130, and will be hereinafter discussed in detail with reference to FIGS. 6 through 10.

The drive ring 118 is provided, on an inner peripheral surface thereof at the rear end of the drive ring 118, with an inner circumferential gear 118g. The focusing ring 119 is provided, on an inner peripheral surface thereof in close vicinity of the front end of the focusing ring 119, with an inner circumferential gear 119g. The AF lens 110 is provided between the outer flange 114a of the stationary ring 114 and the rear end wall 111a of the mount ring 111 with the first one-way rotational transfer mechanism 120 and the second one-way rotational transfer mechanism 130. As shown in FIG. 6, the first one-way rotational transfer mechanism 120 is provided with the first rotary input shaft 121 and a first hollow-cylindrical output gear 122 which is rotatably fitted on the first rotary input shaft 121. The first hollow-cylindrical output gear 122 is provided on an outer peripheral surface thereof with an outer gear portion 122a which is in mesh with the inner circumferential gear 118g of the drive gear 118. The first one-way rotational transfer mechanism 120 allows rotation of the first rotary input shaft 121 to be transferred to the first hollow-cylindrical output gear 122 while preventing rotation of the first hollow-cylindrical output gear 122 from being transferred to the first rotary input shaft 121.

The basic structure of the second one-way rotational transfer mechanism 130 is the same as that of the first one-way rotational transfer mechanism 120. As shown in FIG. 7, the AF lens 110 is provided therein between the outer flange 114a of the stationary ring 114 and the rear end wall 111a of the mount ring 111 with a second rotary input shaft 131 having an axis 131x parallel to the optical axis O. A front bearing hole 114c and a rear bearing hole 111c are coaxially formed on the outer flange 114a and the rear end wall 111a of the mount ring 111, respectively. Front and rear ends of the second rotary input shaft 131 are respectively fitted in the front bearing hole 114c and the rear bearing hole 111c to be supported thereby to be freely rotatable on the axis 131x of the second rotary input shaft 131. A second hollow-cylindrical output gear 132 is rotatably fitted on the second rotary input shaft 131. The second rotary input shaft 131 is provided behind the second hollow-cylindrical output gear 132 with an outer gear portion 131a which is formed integral with said second rotary input shaft 131 to be engaged with the inner circumferential gear 119g of the focusing ring 119. The second hollow-cylindrical output gear 132 is provided on an outer peripheral surface thereof with an outer gear portion 132a which is in mesh with the inner circumferential gear 118g of the drive ring 118. The second one-way rotational transfer mechanism 130 allows rotation of the second rotary input shaft 131 to be transferred to the second hollow-cylindrical output gear 132 while preventing rotation of the second hollow-cylindrical output gear 132 from being transferred to the second rotary input shaft 131.

Figure 8:
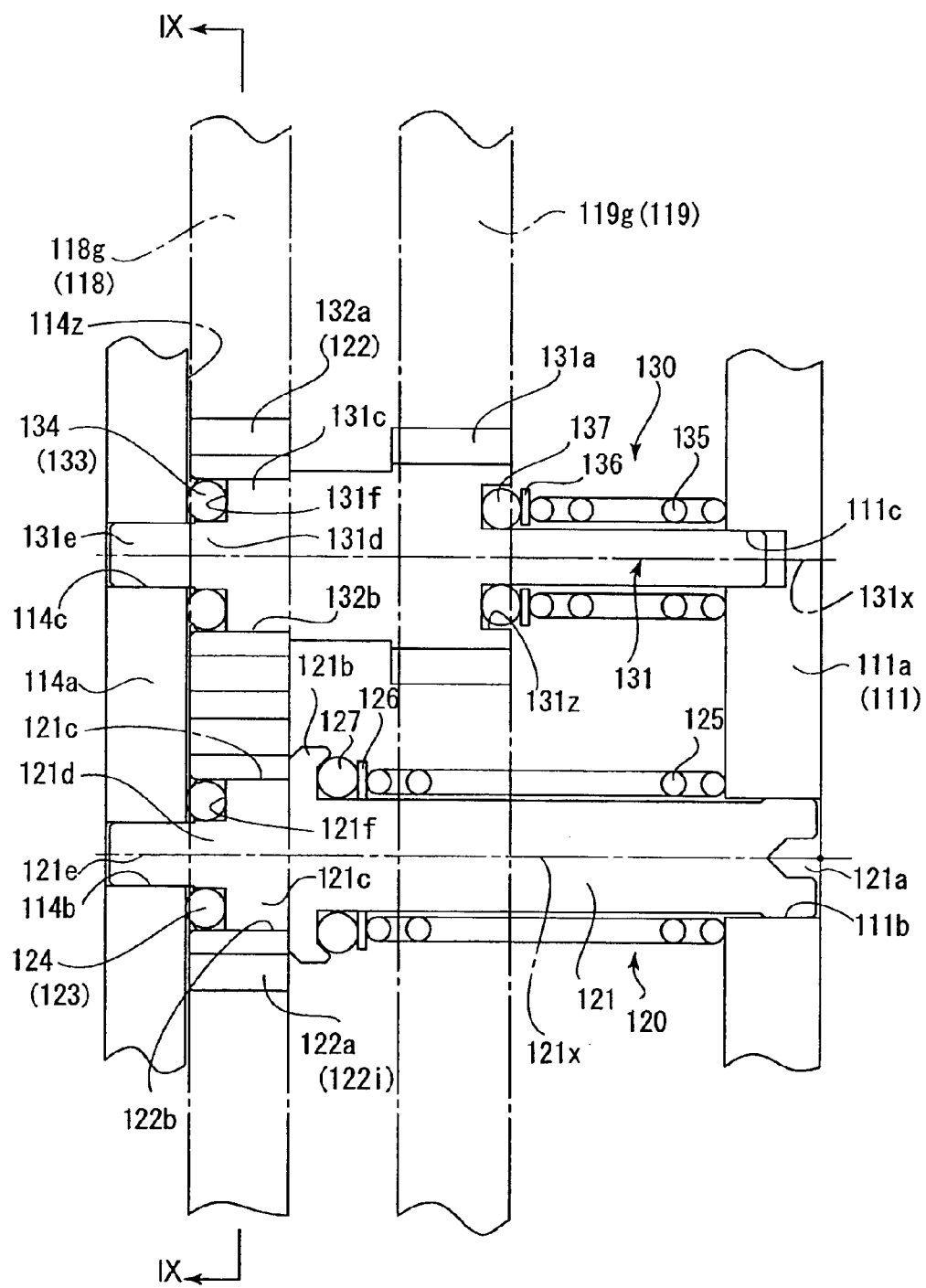
FIG. 8 is a developed view of a first one-way rotational transfer mechanism and a second one-way rotational transfer mechanism which are shown in FIGS. 6 and 7, respectively.
Figure 10:
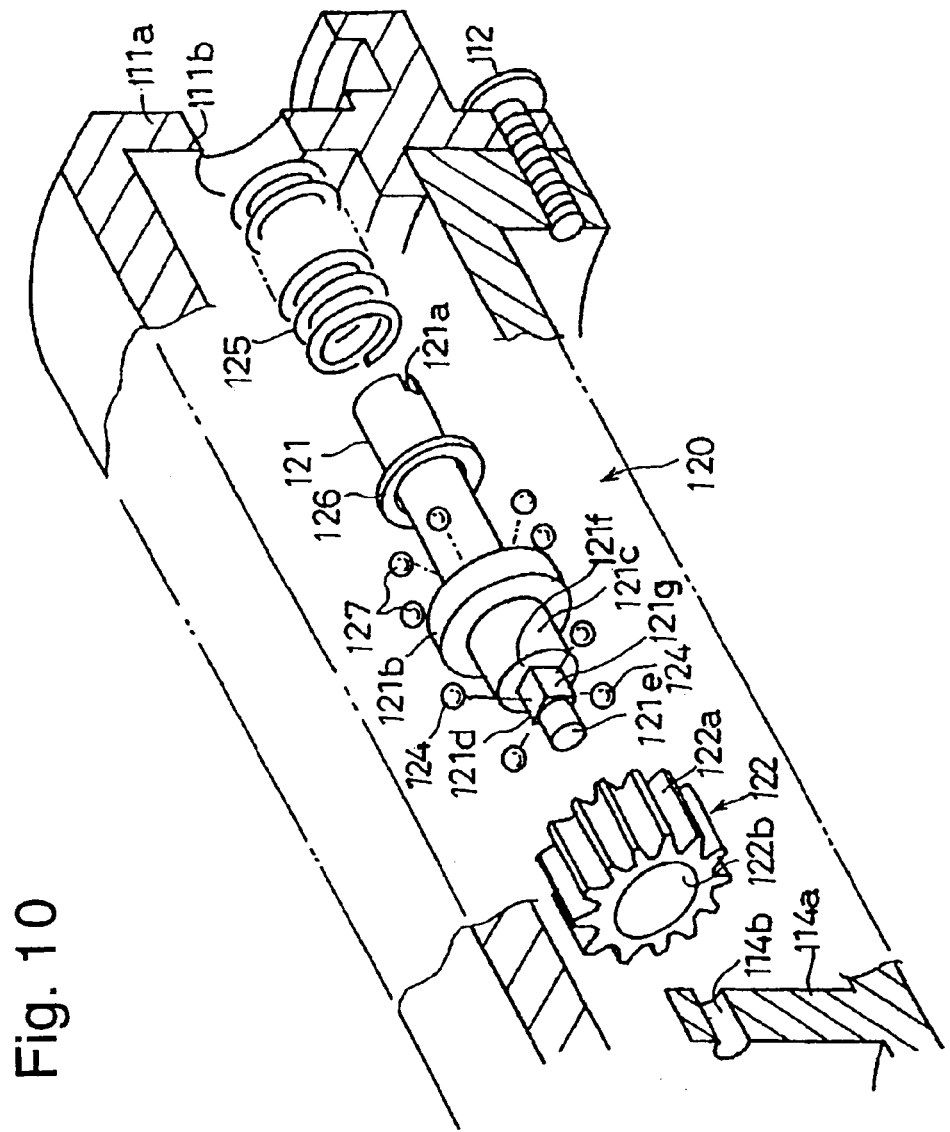
FIG. 10 is an exploded perspective view, partly in cross section, of a fundamental portion of the first one-way rotational transfer mechanism shown in FIG. 8.

As shown in FIG. 8, the difference between the first one-way rotational transfer mechanism 120 and the second one-way rotational transfer mechanism 130 is in that a rotation is given to the first rotary input shaft 121 from the AF motor provided in the camera body via the rotation transfer slot 121a in the first one-way rotational transfer mechanism 120, whereas a rotation is given to the second rotary input shaft 131 from the focusing ring 119 via the engagement of the inner circumferential gear 119g with the outer gear portion 131a in the second one-way rotational transfer mechanism 130. Except for this difference, the first one-way rotational transfer mechanism 120 and the second one-way rotational transfer mechanism 130 are substantially the same in structure. Accordingly, the structure of the first one-way rotational transfer mechanism 120 and the structure of the second one-way rotational transfer mechanism 130 will be hereinafter discussed altogether in detail. FIG. 10 shows only fundamental elements of the first one-way rotational transfer mechanism 120.

The first rotary input shaft 121 is provided with an outer flange 121b, a cylindrical portion 121c, a quadratic prism portion 121d and a supported end 121e in this order from a middle portion of the first rotary input shaft 121 to the front end thereof. The cylindrical portion 121c is fitted in a cylindrical inner peripheral surface 122b of the first hollow-cylindrical output gear 122 so that the first hollow-cylindrical output gear 122 can freely rotate on the cylindrical portion 121c. The quadratic prism portion 121d has a square cross section to serve as a non-circular cross section portion, and has an even thickness in the axial direction of the first rotary input shaft 121. The supported end 121e is rotatably fitted into the front bearing hole 114b.

The second rotary input shaft 131 is provided with the outer gear portion 131a, a cylindrical portion 131c, a quadratic prism portion 131d and a supported end 131e in this order from a middle portion of the second rotary input shaft 131 to the front end thereof. The cylindrical portion 131c is fitted in a cylindrical inner peripheral surface 132b of the second hollow-cylindrical output gear 132 so that the second hollow-cylindrical output gear 132 can freely rotate on the cylindrical portion 131c. The quadratic prism portion 131d has a square cross section to serve as a non-circular cross section, and has an even thickness in the axial direction of the second rotary input shaft 131. The supported end 131e is rotatably fitted into the front bearing hole 114c.

The quadratic prism portion 121d (131d) has a square shape in cross section the center of which is coincident with the axis 121x (131x) of the rotary input shaft 121 (131) as viewed from one end of the axis 121x (131x). The outer peripheral surface of the quadratic prism portion 121d (131d) is provided with four contact surfaces 121g (131g) arranged at regular intervals of 90 degrees about the axis 121x (131x). Each contact surface 121g (131g) is a flat surface, and extends orthogonal to a radial direction of the rotary input shaft 121 (131). The cylindrical portion 121c (131c) is provided, on one side thereof adjacent to the quadratic prism portion 121e (131e) (i.e., the left side as viewed in FIG. 8), with an orthogonal surface 121f (131f) which lies in a plane orthogonal to the axis 121x (131x) of the rotary input shaft 121 (131). The orthogonal surface 121f (131f) serves as a first orthogonal surface. The outer flange 114a of the stationary ring 114 is provided, on one side thereof facing both the orthogonal surface 121f and the orthogonal surface 131f (i.e., the right side as viewed in FIG. 8), with an orthogonal end surface 114z which lies in a plane orthogonal to both the axis 121x of the first rotary input shaft 121 and the axis 131x of the second rotary input shaft 131. Namely, the orthogonal surface 121f and the orthogonal end surface 114z extend parallel to each other, and the orthogonal surface 131f and the orthogonal end surface 114z extend parallel to each other. The orthogonal end surface 114z serves as a second orthogonal surface which faces the first orthogonal surface, i.e., each of the orthogonal surface 121f and the orthogonal surface 131f.

Figure 9:
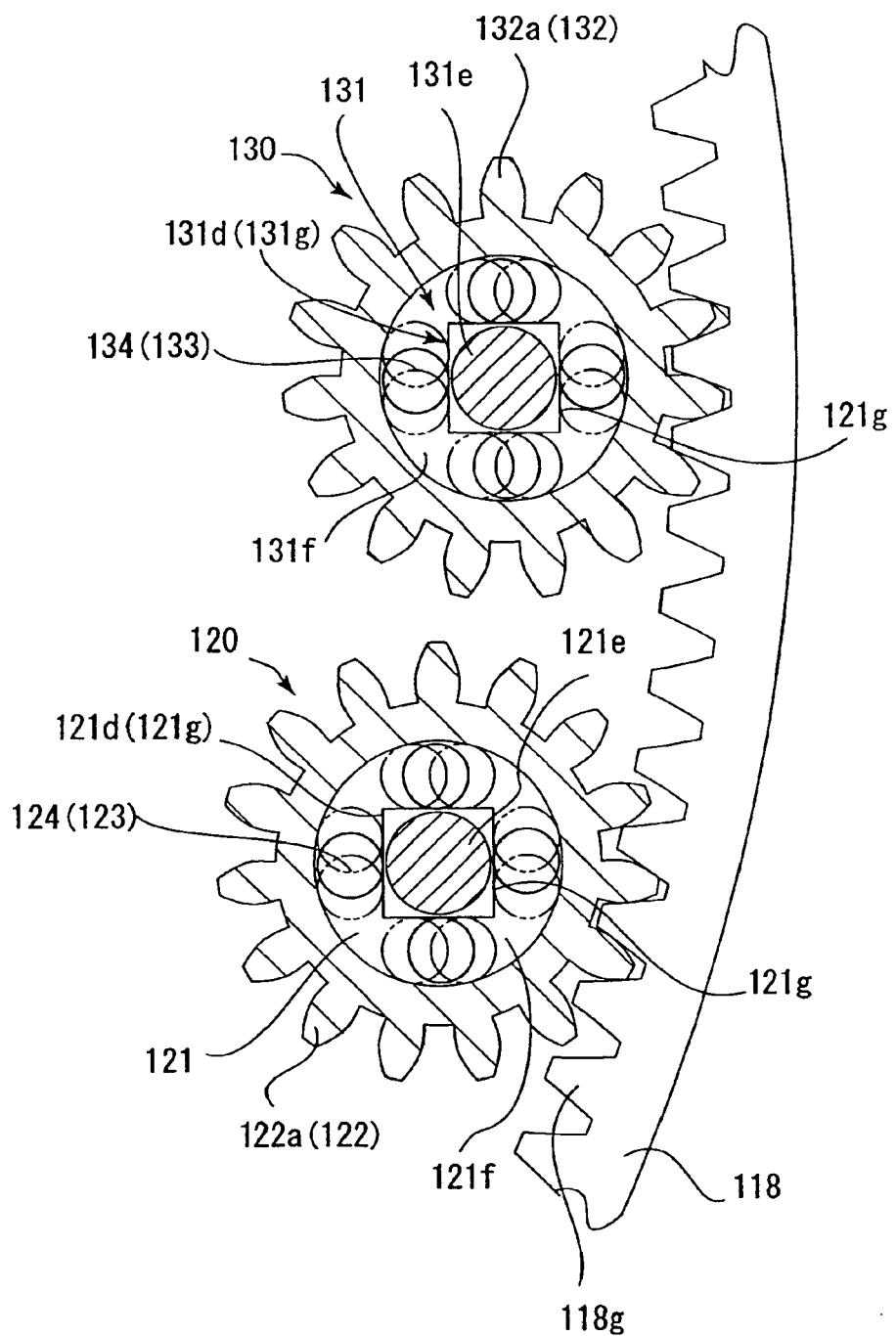
FIG. 9 is a cross sectional view taken along IX—IX line shown in FIG. 8.

The space between the orthogonal end surface 114z of the outer flange 114a and the orthogonal surface 121f (131f) of the cylindrical portion 121c (131c) around the quadratic prism portion 121d (131d) is surrounded by the cylindrical inner peripheral surface 122b (132b) of the hollow-cylindrical output gear 122 (132) to form four accommodation spaces 123 (133) (see FIG. 9). In the embodiment of the one-way rotational transfer mechanism 120 (130), the number of accommodation spaces 123 (133) formed around the quadratic prism portion 121d (131d) is four, and a steel ball 124 (134) is installed in each of the four accommodation spaces 123 (133). The steel balls 124 (134) have a diameter smaller than the maximum width of each accommodation space 123 (133) in a radial direction of the rotary input shaft 121 (131) so that each steel ball 124 (134) can move in the associated accommodation space 123 (133). Each steel ball 124 (134) is a precision engineered hard steel ball. Hardened steel balls of a conventional ball bearing can be used as the steel balls 124 (134).

A compression coil spring 125 is fitted on the first rotary input shaft 121 to be positioned between the outer flange 121b of the first rotary input shaft 121 and the rear end wall 111a of the mount ring 111, while a compression coil spring 135 is fitted on the second rotary input shaft 131 to be positioned between the outer gear portion 131a of the second rotary input shaft 131 and the rear end wall 111a of the mount ring 111. The compression coil spring 125 (135) biases the input rotary shaft 121 (131) along the axis 121x (131x) thereof in a direction to move the orthogonal surface 121f (131f) (first orthogonal surface) of the cylindrical portion 121c (131c) toward the orthogonal end surface 114z (second orthogonal surface) of the outer flange 114a so that the four steel balls 124 (134) are held tight between the orthogonal surface 121f (131f) and the orthogonal end surface 114z. The AF lens 110 is provided between the outer flange 121b and the compression coil spring 125 with a washer 126, and is further provided between the outer flange 121b and the washer 126 with a plurality of steel balls 127. The washer 126 and the plurality of steel balls 127 serve as a device for reducing surface frictional resistance between the outer flange 121b and the compression coil spring 125. As shown in FIG. 8, the outer edge of the outer flange 121b is somewhat bent rearwardly inwards to prevent the plurality of steel balls 127 from coming off. Likewise, the AF lens 110 is provided between the outer gear portion 131a of the second rotary input shaft 131 and the compression coil spring 135 with a washer 136, and is further provided between the outer gear portion 131a and the washer 136 with a plurality of steel balls 137. The washer 136 and the plurality of steel balls 137 serve as a device for reducing surface frictional resistance between the outer gear portion 131a and the compression coil spring 135. As shown in FIG. 8, the outer gear portion 131a is provided on a rear end surface thereof with an annular recess 131z which is centered about the axis 131x of the second rotary input shaft 131 to prevent the plurality of steel balls 137 from coming off.

Operations of the AF lens 110 will be discussed hereinafter. An important aspect in the structure of the one-way rotational transfer mechanism 120 (130) before it operates is that the orthogonal surface 121f (131f) of the cylindrical portion 121c (131c) and each steel ball 124 (134) are in intimate contact with each other via the spring force of the compression coil spring 125 (135); namely, each steel ball 124 (134) is always sandwiched between the orthogonal surface 121f (131f) and the orthogonal end surface 114z. If the first rotary input shaft 121 is rotated by the AF motor provided in the associated camera body to perform an autofocusing operation, or if the second rotary input shaft 131 is rotated by manually rotating the focusing ring 119 via the engagement of the inner circumferential gear 119g with the outer gear portion 131a to perform a manual focusing operation, the orthogonal surface 121f (131f) rotates. This rotation of the orthogonal surface 121f (131f) causes each steel ball 124 (134) to rotate due to the frictional contact between each steel ball 124 (134) with the orthogonal surface 121f (131f). Accordingly, each steel ball 124 (134) moves from a neutral position thereof (indicated by a solid line in FIG. 9), in a rotational direction opposite to the rotational direction of the rotary input shaft 121 (131) with respect to the orthogonal surface 121f (131f), to move into one of wedge-shaped opposite ends which are formed in the associated accommodation space 123 (133) between the associated contact surface 121g (131g) of the quadratic prism portion 121d (131d) and the cylindrical inner peripheral surface 122b (132b) of the hollow-cylindrical output gear 122 (132). As a result, each steel ball 124 (134) comes into firm contact with the cylindrical inner peripheral surface 122b (132b) to thereby transfer rotation of the rotary input shaft 121 (131) to the hollow-cylindrical output gear 122 (132) via the steel balls 124 (134) and the cylindrical inner peripheral surface 122b (132b) of the hollow-cylindrical output gear 122 (132). This action occurs regardless of the rotational direction of the first rotary input shaft 121 (132). Namely, rotation of the first rotary input shaft 121 (132) in either rotational direction can be transferred to the hollow-cylindrical output gear 122 (132).

On the other hand, if a rotation is given to the hollow-cylindrical output gear 122 (132), each steel ball 124 (134) merely rotates in the associated accommodation space 123 (133) because the steel ball 124 (134) is merely in point contact with the cylindrical inner peripheral surface 122b (132b) of the hollow-cylindrical output gear 122 (132) even if the steel ball 124 (134) is in contact with the cylindrical inner peripheral surface 122b (132b). Therefore, no rotation of the hollow-cylindrical output gear 122 (132) is transferred to the rotary input shaft 121 (131) even if a rotation is given to the hollow-cylindrical output gear 122 (132).

Namely, when the rotary input shaft 121 (131) is driven to rotate, each steel ball 124 (134) is engaged with one of the wedge-shaped opposite ends that are formed between the associated contact surface 121g (131g) and the cylindrical inner peripheral surface 122b (132b) because the rotation of the rotary input shaft 121 (131) is transferred to each steel ball 124 (134) via the orthogonal surface 121f (131f); consequently, the rotation of the rotary input shaft 121 (131) is transferred to the hollow-cylindrical output gear 122 (132). However, when the hollow-cylindrical output gear 122 (132) is driven to rotate, very little force or substantially no force is generated, i.e., sufficient force for causing each steel ball 124 (134) to be engaged with one of the wedge-shaped opposite ends is not generated because the rotation of the hollow-cylindrical output gear 122 (132) is transferred to each steel ball 124 (134) via the cylindrical inner peripheral surface 122b (132b). As a consequence, the rotation of the hollow-cylindrical output gear 122 (132) is not transferred to the rotary input shaft 121 (131).

Operations of the AF lens 110 which are associated with the first one-way rotational transfer mechanism 120 and the second one-way rotational transfer mechanism 130 will be discussed hereinafter.

If the first rotary input shaft 121 is rotated by the AF motor provided in the associated camera body to perform an autofocusing operation, the first hollow-cylindrical output gear 122 rotates together with the first rotary input shaft 121. This rotation of the first hollow-cylindrical output gear 122 causes the drive ring 118 to rotate due to the engagement of the outer gear portion 122a of the first hollow-cylindrical output gear 122 with the inner circumferential gear 118g of the drive gear 118. This rotation of the drive ring 118 causes the focusing lens group moving ring 116 (to which the first lens group support frame 17 and the focusing lens group L1 are fixed) to move along the optical axis O while rotating about the optical axis O to perform an autofocusing operation as described above. During the autofocusing operation, the second hollow-cylindrical output gear 132 of the second one-way rotational transfer mechanism 130 rotates by the rotation of the drive ring 118 due to the engagement of the outer gear portion 132a with the inner circumferential gear 118g, whereas the rotation of the second hollow-cylindrical output gear 132 is not transferred to the second rotary input shaft 131; therefore, the focusing ring 119 does not rotate. Accordingly, the focusing ring 119 does not rotate during the autofocusing operation.

On the other hand, if the focusing ring 119 is manually rotated forward and reserve to perform a manual focusing operation, the second rotary input shaft 131 rotates forward and reverse due to the engagement of the outer gear portion 131a with the inner circumferential gear 119g. Since the second one-way rotational transfer mechanism 130 transfers this rotation of the second rotary input shaft 131 to the second hollow-cylindrical output gear 132 as described above, the drive ring 118 rotates due to the engagement of the outer gear portion 132a with the inner circumferential gear 118g. This rotation of the drive ring 118 causes the focusing lens group moving ring 116 (to which the first lens group support frame 17 and the focusing lens group L1 are fixed) to move along the optical axis O while rotating about the optical axis O to perform a manual focusing operation as described above. During this manual focusing operation, the first hollow-cylindrical output gear 122 of the first one-way rotational transfer mechanism 120 rotates by the rotation of the drive ring 118 due to the engagement of the outer gear portion 122a with the inner circumferential gear 118g, whereas the rotation of the first hollow-cylindrical output gear 122 is not transferred to the first rotary input shaft 121; therefore, the first rotary input shaft 121 does not rotate in the manual focusing operation. Accordingly, a manual focusing operation can be performed simply by rotating the focusing ring 119 manually without any special switching mechanism or operation for performing the manual focusing operation.

Figure 11:
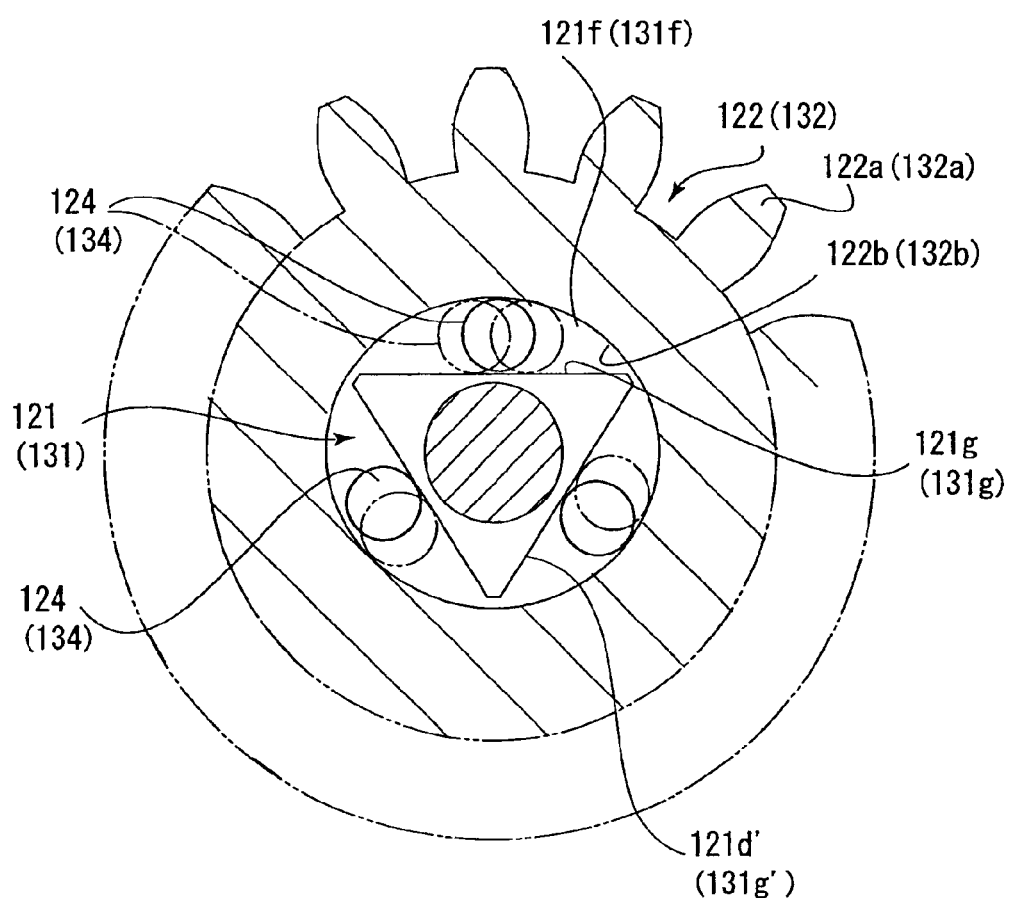
FIG. 11 is a cross sectional view of a second embodiment of the fundamental portion (a non-circular cross section portion) of the first one-way rotational transfer mechanism according to a second aspect of the present invention.
Figure 12:
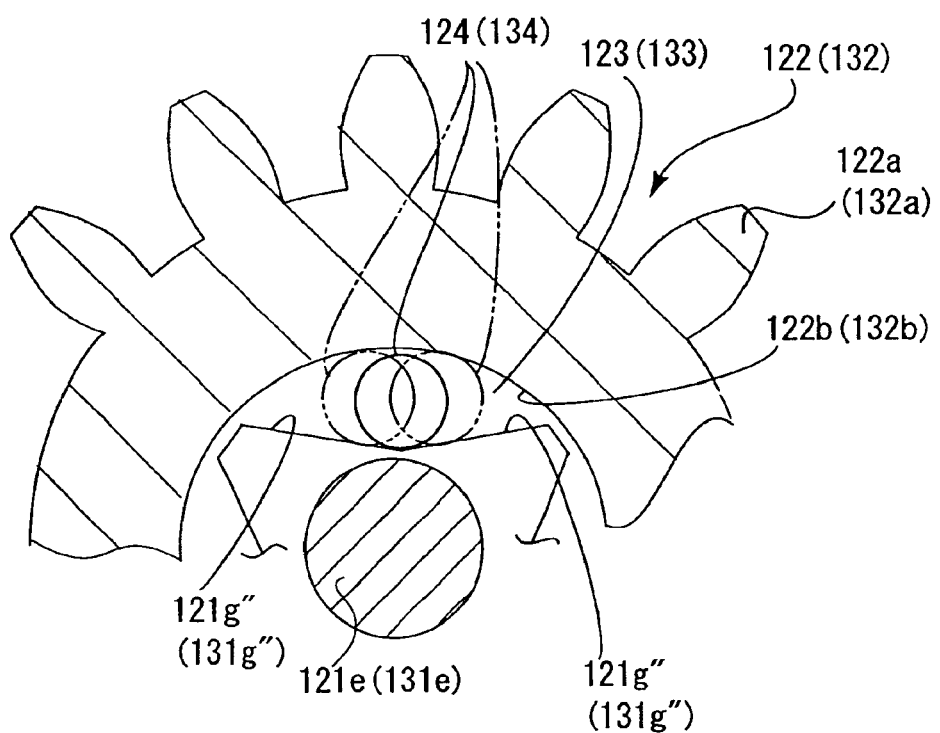
FIG. 12 is a fragmentary cross sectional view of a third embodiment of the fundamental portion (a non-circular cross section portion) of the first one-way rotational transfer mechanism according to a second aspect of the present invention.

If it is desired to change the number of the accommodation spaces 123 (133) (the number of the steel balls 124 (134)), a polygonal prism portion other than a quadratic prism portion such as the quadratic prism portion 121d (131d) only needs to be formed on the rotary input shaft 121 (131), which is the simplest way of changing the number of the accommodation spaces 123 (133). FIG. 11 shows another embodiment (second embodiment) of the non-circular cross section portion of the rotary input shaft 121 (131) according to the second aspect of the present invention. In this embodiment, the non-circular cross section portion of the rotary input shaft 121 (131) is formed as a triangular prism portion 121d' (131d') having an even thickness in the axial direction of the rotary input shaft 121 (131). The outer peripheral surface of the triangular prism portion 121d' (131d') is provided with three contact surfaces 121g (131g) arranged at regular intervals of 120 degrees about the axis of the rotary input shaft 121 (131). Theoretically, the number of the accommodation spaces 123 (133) (the number of the steel balls 124 (134)) can be one if balance does not have to be taken into account. Although each contact surface 121g (131g) is even and extends orthogonal to a radial direction of the rotary input shaft 121 (131) in each of the embodiments shown in FIGS. 9 and 11, each contact surface 121g (131g) can be modified as an uneven surface as shown in another embodiment (third embodiment) shown in FIG. 12 of the non-circular cross section portion of the rotary input shaft 14 according to the second aspect of the present invention. In this embodiment, each contact surface that is in contact with the associated steel ball 124 (134) is formed as a pair of inclined surfaces 121g" (131g") which are symmetrical with respect to a line extending in a radial direction of the rotary input shaft 121 (131). According to this embodiment shown in FIG. 12, the internal angles of the aforementioned wedge-shaped opposite ends can be easily determined and adjusted.

In each of the above described embodiments according to the second aspect of the present invention, the outer gear portion 122a of the first hollow-cylindrical output gear 122 is directly engaged with the inner circumferential gear 118g of the drive ring 118 and also the outer gear portion 132a of the second hollow-cylindrical output gear 132 is directly engaged with the inner circumferential gear 118g of the drive ring 118 for the purpose of simplifying the structure of each embodiment. One or more than one gear (e.g., a gear train) can be installed between the outer gear portion 122a (132a) and the inner circumferential gear 118g. Likewise, one or more than one gear (e.g., a gear train) can be installed between the outer gear portion 131a of the second rotary input shaft 131 and the inner circumferential gear 119g of the focusing ring 119 though the outer gear portion 131a of the hollow-cylindrical output gear 131 is directly engaged with the inner circumferential gear 119g of the focusing ring 119 in each of the above described embodiments according to the second aspect of the present invention.

The second aspect of the present invention can be applied to not only an AF lens such as the above described embodiment of the AF lens 110, but also a power zoom lens at least one movable lens group of which moves by rotating a manual operating ring to perform a zooming operation. For instance, such a power zoom lens can be provided with a mechanism for moving at least two lens groups (focal-length varying lens groups) along the optical axis thereof by a rotation of a manual operating ring (which corresponds to the drive ring 118) or a lens group moving ring (which corresponds to the focusing lens group moving ring 116). This type of mechanism is well known in the art.

As can be understood from the above descriptions, according to the second aspect of the present invention, a power/manual lens barrel, wherein at least one optical element is moved along the optical axis thereof without the manual operating ring being rotated when the rotary input shaft is driven by motor while rotation of the manual operating ring is prevented from being transferred to the rotary input shaft so that the motor cannot be rotated by the rotation of the manual operating ring when the manual operating ring is manually rotated, without any switching mechanism or operation.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel comprising:
   a stationary member;
   a rotary input shaft which is rotatably supported by said stationary member to extend parallel to an optical axis, and includes an orthogonal surface lying in a plane orthogonal to an axis of the rotary input shaft;
   a manual operating ring which is rotatably supported by said stationary member, and is rotated by a rotation of said rotary input shaft via a gear mechanism;
   at least one optical element which is movable along the optical axis by a rotation of said manual operating ring;
   a hollow-cylindrical output gear having a cylindrical inner peripheral surface in which said rotary input shaft is fitted so that said hollow-cylindrical output gear can freely rotate on said rotary input shaft, and an outer gear portion which is formed on an outer peripheral surface of said hollow-cylindrical output gear to be concentric with the cylindrical inner peripheral surface, the outer gear portion serving as a part of said gear mechanism;
   a non-circular cross section portion formed on said rotary input shaft to be adjacent to said orthogonal surface to form at least one accommodation space between said rotary input shaft and said cylindrical inner peripheral surface;
   at least one ball installed in said accommodation space; and
   a biasing device for making said orthogonal surface and said ball come into pressing contact with each other,
   wherein said non-circular cross section portion is shaped so that said rotation of said rotary input shaft is transferred to said hollow-cylindrical output gear via said ball, to which said rotation of said rotary input shaft is given via said orthogonal surface, when said rotary input shaft is driven to rotate.

2. The lens barrel according to claim 1, wherein said stationary member comprises a stationary ring.

3. The lens barrel according to claim 1, wherein said optical element is moved by one of a rotation of said manual operating ring when said manual operating ring is manually rotated and a rotation of said manual operating ring when said manual operating ring is rotated by said rotation of said rotary input shaft via said gear mechanism.

4. The lens barrel according to claim 1, wherein said non-circular cross section portion includes at least one surface which is orthogonal to a radial direction of said rotary input shaft.

5. The lens barrel according to claim 4, wherein the shape of said non-circular cross section portion is a polygon in cross section.

6. The lens barrel according to claim 1, wherein said non-circular cross section portion includes at least one pair of inclined surfaces which are symmetrical with respect to a line extending in a radial direction of said rotary input shaft.

7. The lens barrel according to claim 1, wherein said manual operating ring includes a focusing ring, said lens group being moved along said optical axis to perform a focusing operation when said focusing ring is manually rotated.

8. The lens barrel according to claim 1, wherein said manual operating ring includes a zoom ring, said lens group being moved along said optical axis to perform a zooming operation when said zoom ring is manually rotated.

9. The lens barrel according to claim 1, wherein the shape of said non-circular cross section portion is a square in cross section.

10. The lens barrel according to claim 1, wherein the shape of said non-circular cross section portion is triangular in cross section.

11. The lens barrel according to claim 1, wherein said lens barrel comprises an interchangeable lens barrel which is detachably attached to a camera body.

12. The lens barrel according to claim 11, wherein said rotary input shaft is driven by a drive system provided in said camera body.

13. The lens barrel according to claim 1, wherein said gear mechanism comprises an inner circumferential gear formed on an inner peripheral surface of said manual operating ring.

14. The lens barrel according to claim 1, wherein said biasing device comprises a compression coil spring fitted on said rotary input shaft.

15. A lens barrel comprising:
a stationary member;
a rotary input shaft which is rotatably supported by said stationary member to extend parallel to an optical axis, and includes a first orthogonal surface lying in a plane orthogonal to an axis of said rotary input shaft;
a manual operating ring which is rotatably supported by said stationary member, and is rotated by a rotation of said rotary input shaft via a gearing mechanism;
at least one optical element which is movable along said optical axis by a rotation of said manual operating ring;
a hollow-cylindrical output gear having a cylindrical inner peripheral surface in which said rotary input shaft is fitted so that said hollow-cylindrical output gear can freely rotate on said rotary input shaft, and an outer gear portion which is formed on an outer peripheral surface of said hollow-cylindrical output gear to be concentric with said cylindrical inner peripheral surface, said outer gear portion serving as a part of said gear mechanism;
a second orthogonal surface formed on a support portion of said stationary member to lie in a plane orthogonal to said axis of said rotary input shaft and to face said first orthogonal surface, said support portion supporting said rotary input shaft so that said rotary input shaft can freely rotate on said axis thereof;
a non-circular cross section portion formed on said rotary input shaft between said first orthogonal surface and said second orthogonal surface to form at least one accommodation space between said rotary input shaft and said cylindrical inner peripheral surface;
at least one ball installed in said accommodation space; and
a biasing device which biases said rotary input shaft in a direction along said axis thereof to reduce a space between said first orthogonal surface and said second orthogonal surface so that said ball is held tightly between said first orthogonal surface and said second orthogonal surface,
wherein said non-circular cross section portion is shaped so that said rotation of said rotary input shaft is transferred to said hollow-cylindrical output gear via said ball, to which said rotation of said rotary input shaft is given via said first orthogonal surface, when said rotary input shaft is driven to rotate.

16. The lens barrel according to claim 15, wherein said stationary member comprises a stationary ring.

17. The lens barrel according to claim 15, wherein said optical element is moved by one of a rotation of said manual operating ring when said manual operating ring is manually rotated and a rotation of said manual operating ring when said manual operating ring is rotated by said rotation of said rotary input shaft via said gear mechanism.

18. The lens barrel according to claim 15, wherein said non-circular cross section portion includes at least one surface which is orthogonal to a radial direction of said rotary input shaft.

19. The lens barrel according to claim 18, wherein the shape of said non-circular cross section portion is a polygon in cross section.

20. The lens barrel according to claim 15, wherein said non-circular cross section portion includes at least one pair of inclined surfaces which are symmetrical with respect to a line extending in a radial direction of said rotary input shaft.

21. The lens barrel according to claim 15, wherein said manual operating ring includes a focusing ring, said lens group being moved along said optical axis to perform a focusing operation when said focusing ring is manually rotated.

22. The lens barrel according to claim 15, wherein said manual operating ring includes a zoom ring, said lens group being moved along said optical axis to perform a zooming operation when said zoom ring is manually rotated.

23. The lens barrel according to claim 15, wherein the shape of said non-circular cross section portion is a square in cross section.

24. The lens barrel according to claim 15, wherein the shape of said non-circular cross section portion is triangular in cross section.

25. The lens barrel according to claim 15, wherein said lens barrel comprises an interchangeable lens barrel which is detachably attached to a camera body.

26. The lens barrel according to claim 25, wherein said rotary input shaft is driven by a drive system provided in said camera body.

27. The lens barrel according to claim 15, wherein said gear mechanism comprises an inner circumferential gear formed on an inner peripheral surface of said manual operating ring.

28. The lens barrel according to claim 15, wherein said biasing device comprises a compression coil spring fitted on said rotary input shaft.

29. A lens barrel comprising:
a stationary member;
at least one optical element guided along an optical axis;
a manual operating ring which is rotatably supported by said stationary member;
a drive ring which is rotatably supported by said stationary member, a rotation of said drive ring causing said optical element to move along said optical axis;
a first rotary input shaft which is rotatably supported by said stationary member to extend parallel to said optical axis, and is rotated by a driving force received from a drive system of a camera body;
a first hollow-cylindrical output gear which is rotatably fitted on said first rotary input shaft, said first hollow-cylindrical output gear including a first outer gear portion formed on an outer peripheral surface of said first hollow-cylindrical output gear to be engaged with at least one drive-ring rotating gear for rotating said drive ring;
a second rotary input shaft which is rotatably supported by said stationary member to extend parallel to said optical axis;
a second hollow-cylindrical output gear which is rotatably fitted on said second rotary input shaft, said second hollow-cylindrical output gear including a second outer gear portion formed on an outer peripheral surface of said second hollow-cylindrical output gear to be engaged with said drive-ring rotating gear;

a third outer gear portion formed on said second rotary input shaft to be engaged with said manual operating ring, said second rotary input shaft being rotated via said third outer gear potion and said manual operating ring when said manual operating ring is manually rotated;

a first one-way rotational transfer mechanism which allows rotation of said first rotary input shaft to be transferred to said first hollow-cylindrical output gear while preventing rotation of said first hollow-cylindrical output gear to be transferred to said first rotary input shaft; and a second one-way rotational transfer mechanism which allows rotation of said second rotary input shaft to be transferred to said second hollow-cylindrical output gear while preventing rotation of said second hollow-cylindrical output gear to be transferred to said second rotary input shaft.

30. The lens barrel according to claim 29, wherein said stationary member comprises a stationary ring.

31. The lens barrel according to claim 29, wherein said first one-way rotational transfer mechanism comprises:

a first orthogonal surface formed on said first rotary input shaft to lie in a plane orthogonal to an axis of said first rotary input shaft;

a first cylindrical inner peripheral surface formed on said first hollow-cylindrical output gear so that said first rotary input shaft is fitted in said first cylindrical inner peripheral surface to be freely rotatable relative to said first hollow-cylindrical output gear;

a first non-circular cross section portion formed on said first rotary input shaft to be adjacent to said first orthogonal surface to form at least one first accommodation space between said first rotary input shaft and said first cylindrical inner peripheral surface;

at least one first ball installed in said first accommodation space; and a first biasing device for making said first orthogonal surface and said first ball come into pressing contact with each other, wherein said first non-circular cross section portion is shaped so that said rotation of said first rotary input shaft is transferred to said first hollow-cylindrical output gear via said first ball to which said rotation of said first rotary input is given from said first orthogonal surface when said first rotary input shaft is driven to rotate, wherein said second one-way rotational transfer mechanism comprises:

a second orthogonal surface formed on said second rotary input shaft to lie in a plane orthogonal to an axis of said second rotary input shaft;

a second cylindrical inner peripheral surface formed on said second hollow-cylindrical output gear so that said second rotary input shaft is fitted in said second cylindrical inner peripheral surface to be freely rotatable relative to said second hollow-cylindrical output gear;

a second non-circular cross section portion formed on said second rotary input shaft to be adjacent to said second orthogonal surface to form at least one second accommodation space between said second rotary input shaft and said second cylindrical inner peripheral surface;

at least one second ball installed in said second accommodation space; and a second biasing device for making said second orthogonal surface and said second ball come into pressing contact with each other, wherein said second non-circular cross section portion is shaped so that said rotation of said second rotary input shaft is transferred to said second hollow-cylindrical output gear via said second ball to which said rotation of said second rotary input is given from said second orthogonal surface when said second rotary input shaft is driven to rotate.

32. The lens barrel according to claim 29, wherein said first one-way rotational transfer mechanism comprises:

a first orthogonal surface formed on said first rotary input shaft to lie in a plane orthogonal to an axis of said first rotary input shaft;

a first cylindrical inner peripheral surface formed on said first hollow-cylindrical output gear so that said first rotary input shaft is fitted in said first cylindrical inner peripheral surface to be freely rotatable relative to said first hollow-cylindrical output gear;

a second orthogonal surface formed on a support portion of said stationary member to lie in a plane orthogonal to said axis of said first rotary input shaft and to face said first orthogonal surface, said support portion supporting said first rotary input shaft so that said first rotary input shaft can freely rotate on said axis thereof;

a first non-circular cross section portion formed on said first rotary input shaft between said first orthogonal surface and said second orthogonal surface to form at least one first accommodation space between said first rotary input shaft and said first cylindrical inner peripheral surface;

at least one first ball installed in said first accommodation space; and a first biasing device which biases said first rotary input shaft in a direction along said axis thereof to reduce a space between said first orthogonal surface and said second orthogonal surface so that said first ball is held tightly between said first orthogonal surface and said second orthogonal surface, wherein said first non-circular cross section portion is shaped so that said rotation of said first rotary input shaft is transferred to said first hollow-cylindrical output gear via said first ball to which said rotation of said first rotary input is given from said first orthogonal surface when said first rotary input shaft is driven to rotate, wherein said second one-way rotational transfer mechanism comprises:

a third orthogonal surface formed on said second rotary input shaft to lie in a plane orthogonal to an axis of said second rotary input shaft;

a second cylindrical inner peripheral surface formed on said second hollow-cylindrical output gear so that said second rotary input shaft is fitted in said second cylindrical inner peripheral surface to be freely rotatable relative to said second hollow-cylindrical output gear;

a fourth orthogonal surface formed on said support portion of said stationary member to lie in a plane orthogonal to said axis of said second rotary input shaft and to face said third orthogonal surface, said support portion supporting said second rotary input shaft so that said second rotary input shaft can freely rotate on said axis thereof;

a second non-circular cross section portion formed on said second rotary input shaft between said third orthogonal surface and said fourth orthogonal surface to form at least one second accommodation space between said second rotary input shaft and said second cylindrical inner peripheral surface;

at least one second ball installed in said second accommodation space; and a second biasing device which biases said second rotary input shaft in a direction along said axis thereof to reduce a space between said third orthogonal surface and said fourth orthogonal surface so that said second ball is held tightly between said third orthogonal surface and said fourth orthogonal surface, wherein said second non-circular cross section portion is shaped so that said rotation of said second rotary input shaft is transferred to said second hollow-cylindrical output gear via said second ball to which said rotation of said second rotary input is given from said third orthogonal surface when said second rotary input shaft is driven to rotate.

33. The lens barrel according to claim 32, wherein said first orthogonal surface and said second orthogonal surface lie in a common surface of said support portion.

34. The lens barrel according to claim 31, wherein said first non-circular cross section portion includes at least one first surface orthogonal to a radial direction of said first rotary input shaft, and wherein said second non-circular cross section portion includes at least one second surface orthogonal to a radial direction of said second rotary input shaft.

35. The lens barrel according to claim 34, wherein each of said first non-circular cross section portion and said second non-circular cross section portion is in the shape of a polygon in cross section.

36. The lens barrel according to claim 31, wherein said first non-circular cross section portion includes at least one first pair of inclined surfaces which are symmetrical with respect to a line extending in a radial direction of said first rotary input shaft, and wherein said second non-circular cross section portion includes at least one second pair of inclined surfaces which are symmetrical with respect to a line extending in a radial direction of said second rotary input shaft.

37. The lens barrel according to claim 29, wherein said manual operating ring includes a focusing ring, said lens group being moved along said optical axis to perform a focusing operation when said focusing ring is manually rotated.

38. The lens barrel according to claim 29, wherein said manual operating ring includes a zoom ring, said lens group being moved along said optical axis to perform a zooming operation when said zoom ring is manually rotated.

39. The lens barrel according to claim 31, wherein the shape of each of said first non-circular cross section portion and said second non-circular cross section portion is a square in cross section.

40. The lens barrel according to claim 31, wherein the shape of each of said first non-circular cross section portion and said second non-circular cross section portion is triangular in cross section.

41. The lens barrel according to claim 29, wherein said lens barrel comprises an interchangeable lens barrel which is detachably attached to a camera body.

42. The lens barrel according to claim 31, wherein said first biasing device comprises a first compression coil spring fitted on said rotary input shaft, and wherein said second biasing device comprises a second compression coil spring fitted on said rotary input shaft.

43. An interchangeable lens comprising:

a photographing optical system including at least one movable lens group guided along an optical axis;

a mount ring a rear end of which is detachably attached to a camera body;

a drive shaft which extends parallel to said optical axis, and includes an orthogonal surface lying in a plane orthogonal to an axis of said drive shaft, a rear end of said drive shaft being coupled with a drive system provided in said camera body when said rear end of said mount ring is properly attached to said camera body;

a manual operating ring which is rotated by a rotation of said drive shaft via a gear mechanism, said movable lens group being moved along said optical axis by a rotation of said manual operating ring;

a hollow-cylindrical output gear having a cylindrical inner peripheral surface in which said drive shaft is fitted so that said hollow-cylindrical output gear can freely rotate on said drive shaft, and an outer gear portion which is formed on an outer peripheral surface of said hollow-cylindrical output gear to be concentric with said cylindrical inner peripheral surface, said outer gear portion serving as a part of said gear mechanism;

a non-circular cross section portion formed on said drive shaft to be adjacent to said orthogonal surface to form a plurality of accommodation spaces between said drive shaft and said cylindrical inner peripheral surface;

a plurality of balls installed in said plurality of accommodation spaces, respectively; and a biasing device for making said orthogonal surface and said plurality of balls come into pressing contact with each other, wherein said non-circular cross section portion is shaped so that said rotation of said drive shaft is transferred to said hollow-cylindrical output gear via said plurality of balls, to which said rotation of said rotary input is given via said orthogonal surface, when said drive shaft is driven to rotate.

* * * * *